(12) United States Patent
Matsumoto

(10) Patent No.: US 7,860,284 B2
(45) Date of Patent: Dec. 28, 2010

(54) IMAGE PROCESSING METHOD AND COMPUTER READABLE MEDIUM FOR IMAGE PROCESSING

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 1002 days.

(21) Appl. No.: 11/669,184

(22) Filed: Jan. 31, 2007

(65) Prior Publication Data

US 2007/0183644 A1    Aug. 9, 2007

(30) Foreign Application Priority Data

Feb. 9, 2006    (JP)    .............................. 2006-032757

(51) Int. Cl.
*G06K 9/00*    (2006.01)
(52) U.S. Cl. ........................ 382/128; 382/131; 382/132; 382/154

(58) Field of Classification Search ................. 382/128, 382/131, 132, 154; 345/424, 426; 378/8, 378/62; 714/1
See application file for complete search history.

(56) References Cited

U.S. PATENT DOCUMENTS 5,793,375 A * 8/1998 Tanaka ........................ 345/426

FOREIGN PATENT DOCUMENTS

WO    2005/101314 A2    10/2005

* cited by examiner

*Primary Examiner*—Anh Hong Do
(74) *Attorney, Agent, or Firm*—Pearne & Gordon LLP

(57) ABSTRACT

An image processing method using volume data includes: extracting a region of the volume data; transforming voxel values in the extracted region into at least two different voxel values; and presenting information of the extracted region by using the transformed voxel values.

18 Claims, 18 Drawing Sheets

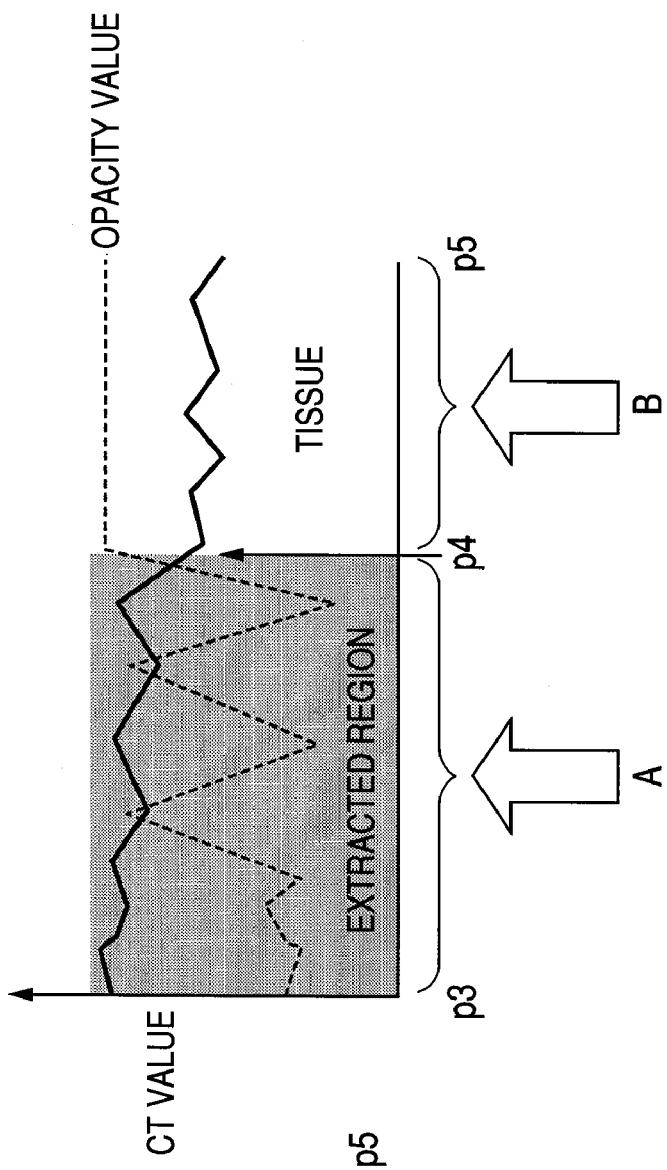
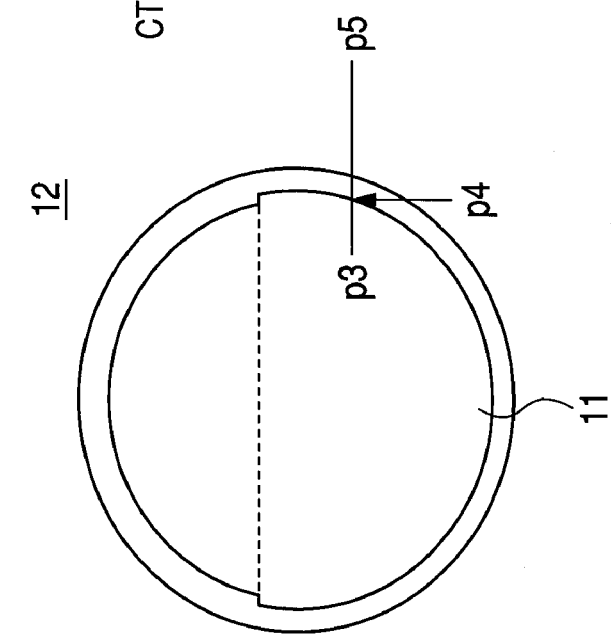

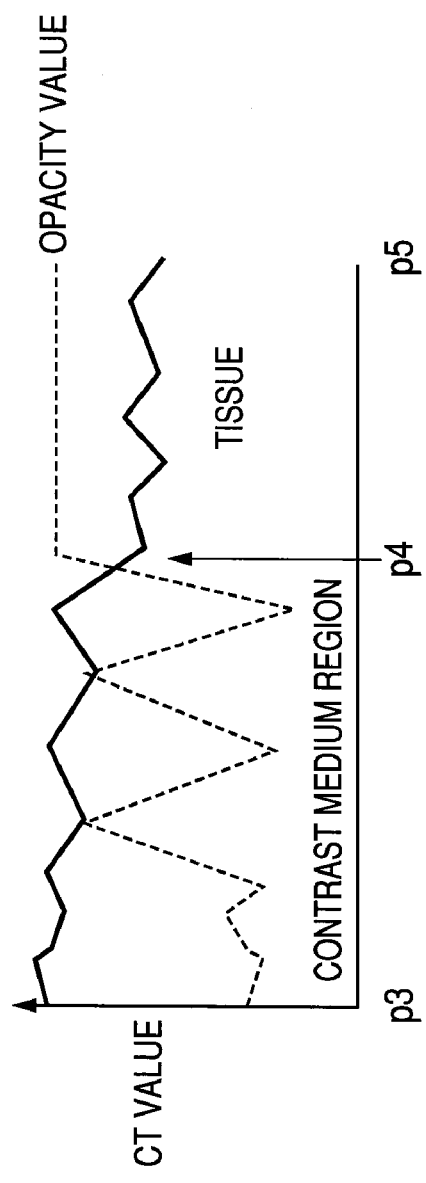
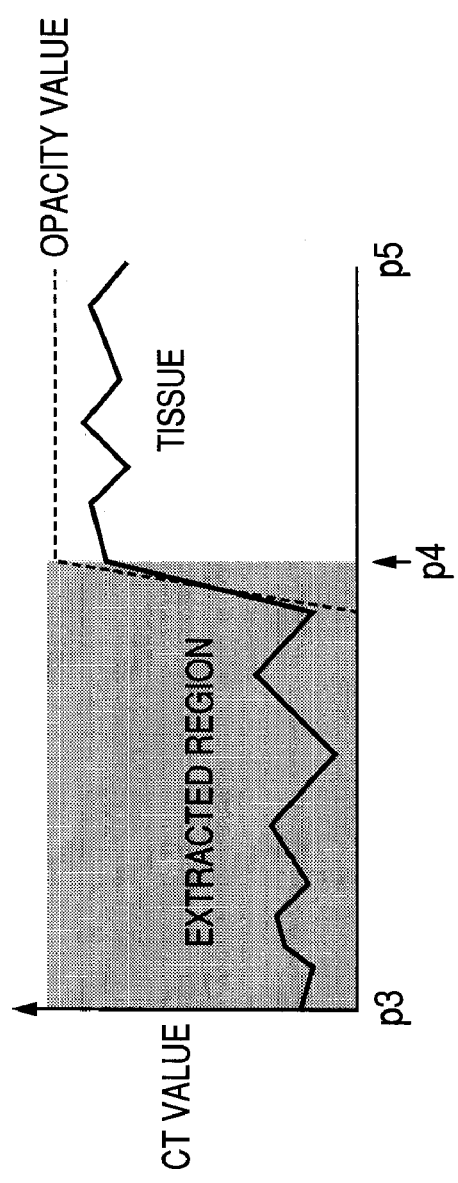
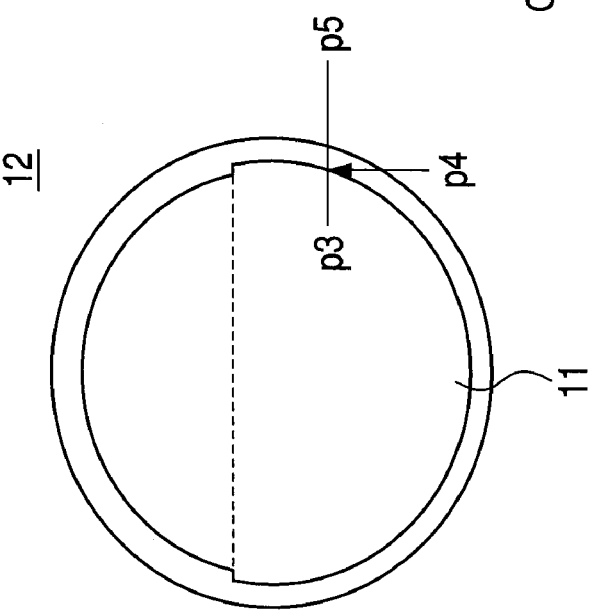

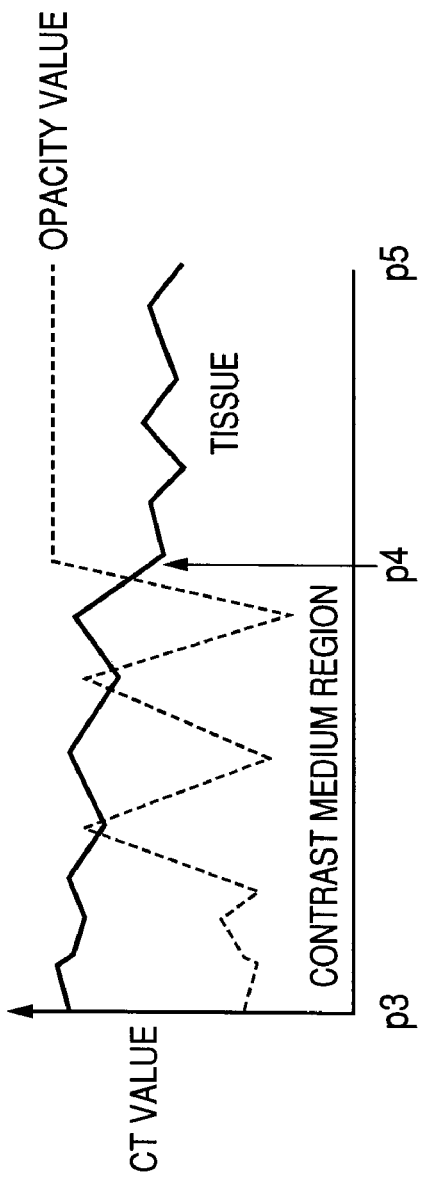
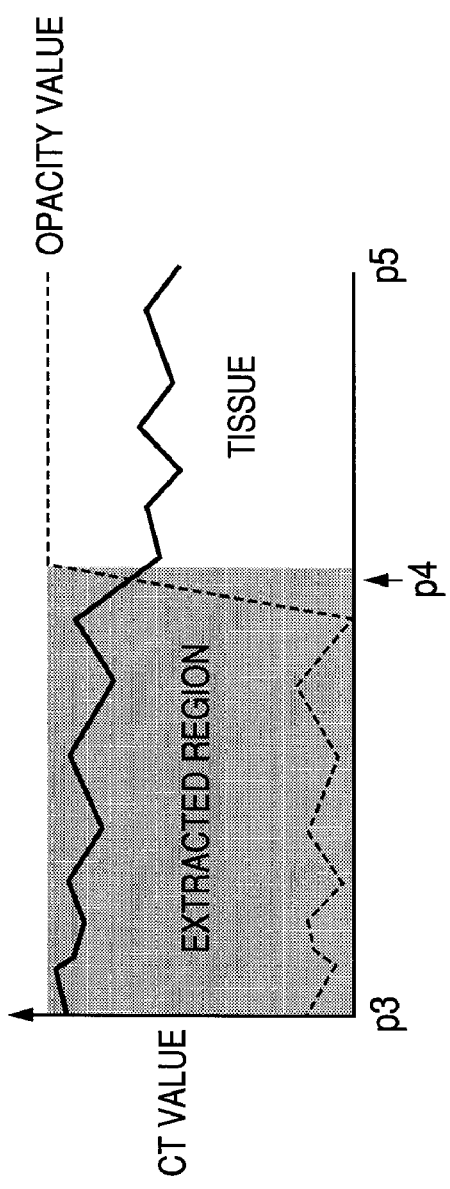
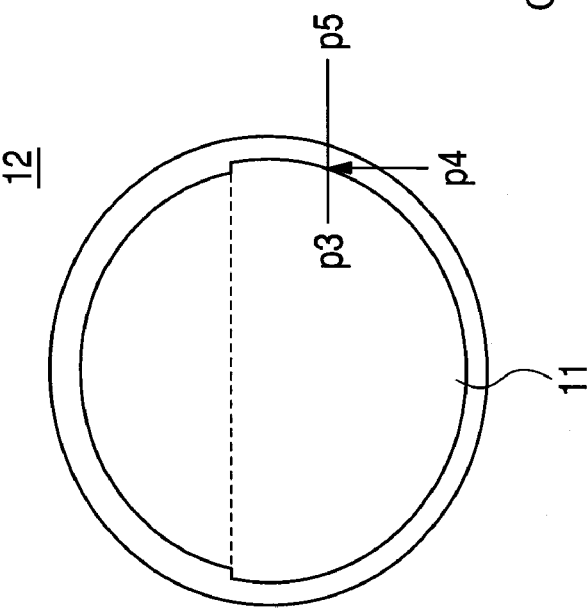

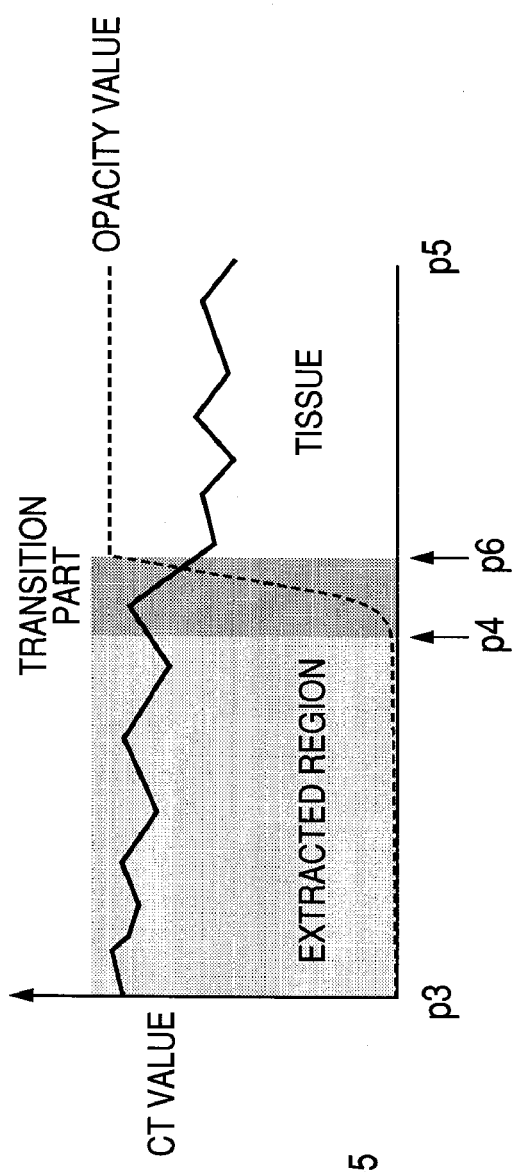
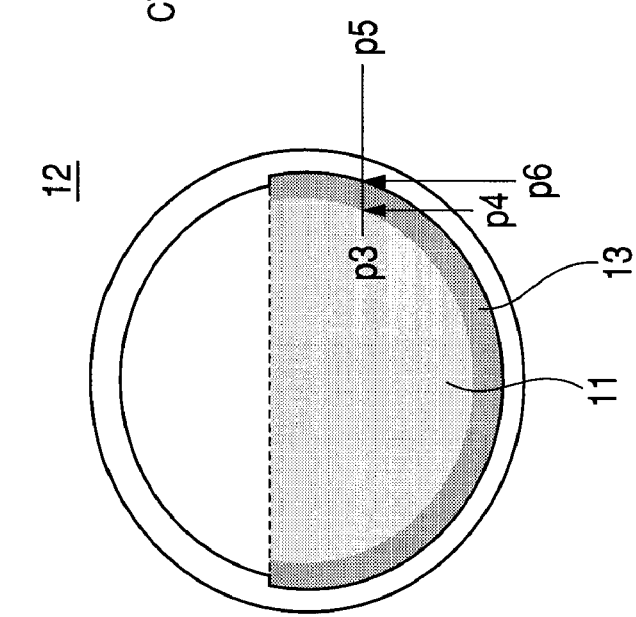
FIG. 11B
FIG. 11A

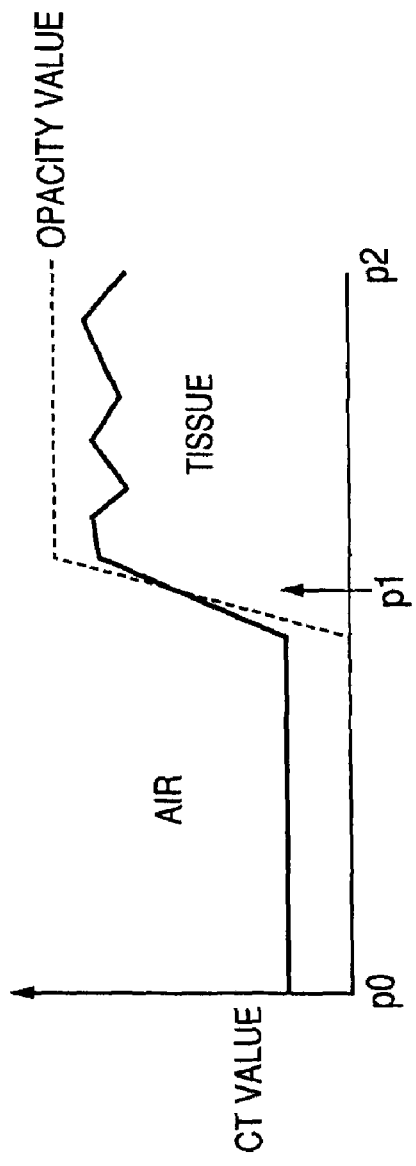
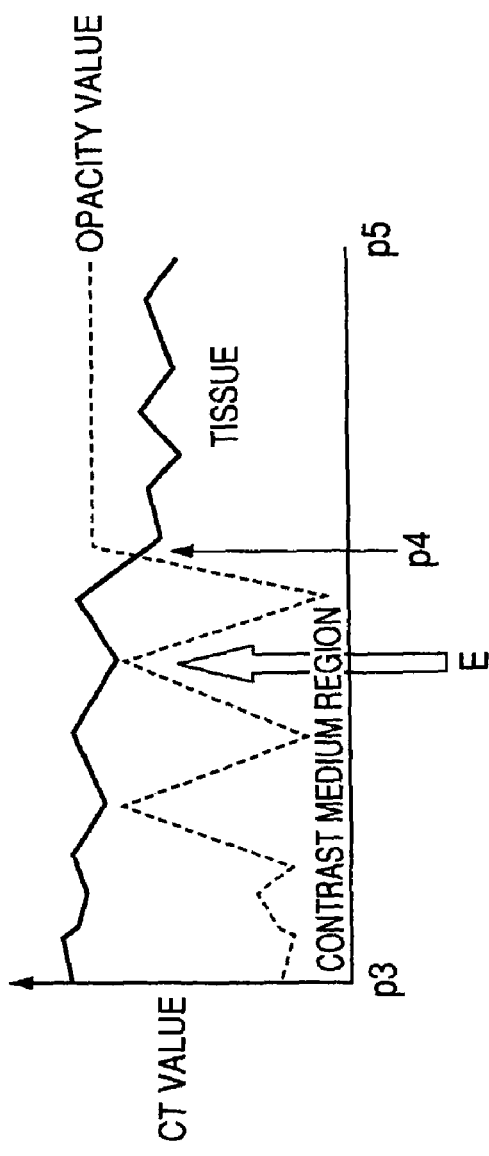
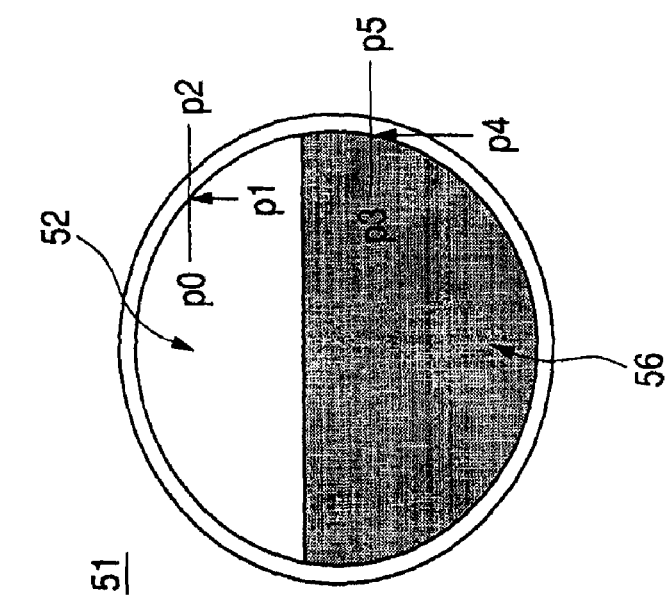

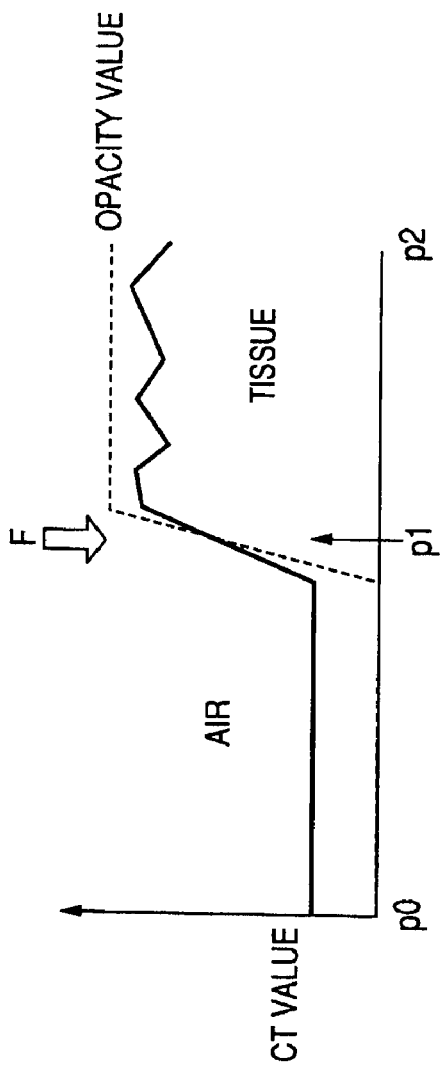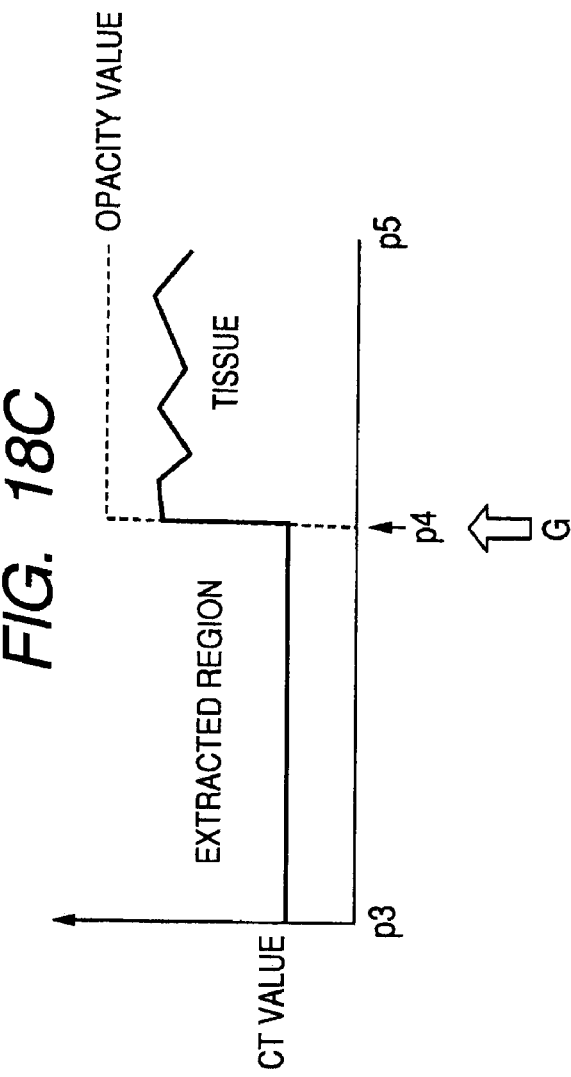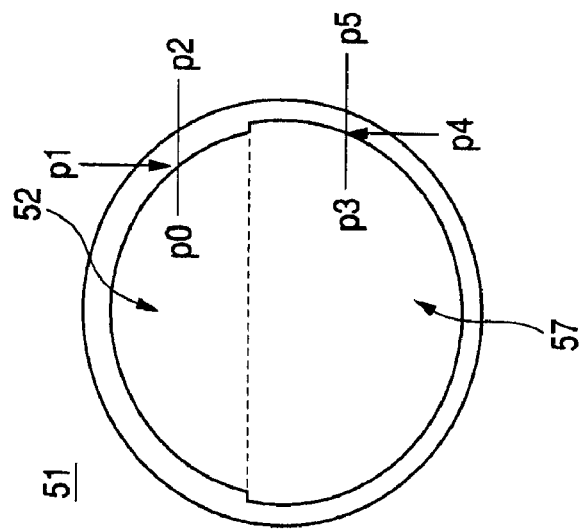

IMAGE PROCESSING METHOD AND COMPUTER READABLE MEDIUM FOR IMAGE PROCESSING

This application claims foreign priority based on Japanese Patent application No. 2006-032757, filed Feb. 9, 2006, the content of which is incorporated herein by reference in its entirety.

BACKGROUND OF THE INVENTION

1. Field of the Invention

This invention relates to an image processing method and a computer readable medium for image processing, for rendering an observation object by using volume data.

2. Description of the Related Art

A technique for visualizing the inside of a three-dimensional object has attracted public attention with the advance of image processing technology using a computer in recent years. Particularly in the medical field, medical diagnosis using a CT (Computed Tomography) apparatus or MRI (Magnetic Resonance Imaging) apparatus has been performed widely because a lesion can be detected early by visualizing the inside of a living body.

On the other hand, volume rendering is known as a method for obtaining a three-dimensional image of the inside of an object. In volume rendering, ray is emitted onto a three-dimensional voxel (micro volume element) space to thereby project an image on a projection plane. This operation is referred to as ray casing. In ray casting, a voxel value is acquired from a voxel at each sampling point which is sampled at a regular interval along the path of the ray.

The voxel is a unit for constituting a three-dimensional region of an object. The voxel value is a specific data expressing characteristic such as a density value of the voxel. The whole object is expressed by voxel data which is a three-dimensional arrangement of the voxel value. Generally, two-dimensional tomogram data obtained by CT is collected along a direction perpendicular to each sectional layer, and voxel data which is the three-dimensional arrangement of voxel value is obtained by performing necessary interpolation.

FIGS. 12A and 12B show a situation in which an organ is rendered using volume data. When an organ containing a residual is rendered, if a contrast medium is injected to clean and visualize the residual in an intestine 50 and the inside of the intestine 50 is cleaned, the contrast medium remains in the intestine 50 and a contrast medium region 56 appears as shown in FIG. 12A. Then, there is a demand to remove the contrast medium region 56 for rendering as shown in FIG. 12B. The removal can be done by performing segmentation (region extraction) of the contrast medium region 56.

To remove the contrast medium region 56 from the rendering object, hitherto a method of transforming CT values of the extracted region into values that will not be rendered (such as air) has been conducted. FIG. 13 is a graph to show the correspondence between the CT values of the extracted region before transform and those after transform in the image processing method in the related art. As shown in the figure, hitherto the CT values of air in a region, tissue, and contrast medium range have been transformed uniformly into the same value (CT value somewhere represents air). That is, CT values in the region determined to be the contrast medium region in the segmentation process is transformed into the uniform CT value.

FIG. 14 is a flowchart to show the image processing method in the related art. In the image processing method in the related art, the volume data of an organ is acquired from a CT apparatus (step S51) and, contrast medium region is extracted. For example, residual remained in the intestine which contains contrast medium shall form contrast medium region (step S52). The CT values of the extracted region are transformed into the CT value somewhere represents air (step S53), and the transformed CT values are used to silhouette the organ (step S54). A mask can be used instead of CT value transforming as an alternative rendering method.

Next, the terms concerning the internal tissue regions of a human body will be discussed with FIG. 15. Here, relative to a tissue 51 of the inside of a human body such as a large intestine and its neighbor, a region 53 is called "lumen," a wall surface 54 is called "inner wall surface," and a region 55 is called "inside of wall." The lumen 53 is separated into an air region 52 and a contrast medium (residual) region 56.

FIG. 16 is a drawing to describe a problem of the image processing method in the related art. According to the image processing method in the related art, if an attempt is made to segment a contrast medium region and render a region 57 where the contrast medium region is removed by using the extracted region, upon rendering, a step is generated at the position of the interface between the air region 52 and the region 57 where the contrast medium region is removed as indicated by an arrow D, and a polyp, etc., existing in that portion cannot clearly be observed.

FIGS. 17A-17C show drawings for explaining profiles of change of CT values in the tissue, the air region and the contrast medium region. FIG. 17A shows, in rendering the organ containing a residual, the tissue 51 such as an intestine, the air region 52 of the lumen, and the contrast medium region 56 produced by a contrast medium remained in the lumen.

FIG. 17B shows the CT values and opacity values (derived from CT values) on a profile line p0-p2 passing through a point p0 in the air region 52 of the lumen, a point p1 in the inner wall surface of the tissue 51, and a point p2 in the tissue 51. FIG. 17C shows the CT values and opacity values on a profile line p3-p5 passing through a point p3 in the contrast medium region 56 of the lumen, a point p4 in the inner wall surface of the tissue 51, and a point p5 in the tissue 51. Usually, the opacity value is uniquely calculated using a lookup table (LUT) from the CT values.

The CT values and the opacity values on the profile line p0-p2 from the point p0 to the point p2 make a smooth transition between the air region 52 and the tissue 51 as shown in FIG. 17B. On the other hand, for the CT values and the opacity values on the profile line p3-p5 from the point p3 to the point p5, if the CT values of the contrast medium region 56 left in the tissue 51 are close to those of the tissue 51 as indicated by an arrow E in FIG. 17C, it becomes difficult to discriminate between the contrast medium region 56 and the tissue 51, and a virtual ray is blocked by a portion where an opacity value is high in the contrast medium region 56. Thus, in the image processing method in the related art, the quality of the volume rendering is impaired by the presence of the contrast medium region 56.

FIGS. 18A-18C are drawings to describe cause (1) of the problem in the image processing method in the related art. FIG. 18A shows, in rendering the organ containing a residual, the tissue 51 such as an intestine, the air region 52 of the lumen, and the region (extracted region) 57 where the contrast medium region is virtually removed.

FIG. 18B shows the CT values and opacity values on a profile line p0-p2 passing through a point p0 in the air region 52 of the lumen, a point p1 in the inner wall surface of the tissue 51, and a point p2 in the tissue 51. FIG. 18C shows the CT values and opacity values on a profile line p3-p5 passing through a point p3 in the extracted region 57, a point p4 in the inner wall surface of the tissue 51, and a point p5 in the tissue 51.

The CT values and the opacity values on the profile line p0-p2 from the point p0 to the point p2 make a smooth transition according to the resolution in the boundary portion between the air region 52 and the tissue 51 as indicated by an arrow F in FIG. 18B. On the other hand, the CT values and the opacity values on the profile line p3-p5 from the point p3 to the point p5 change discontinuously due to binary extraction as indicated by an arrow G in FIG. 18C, and thus a step is generated and smoothness is lost in the method of uniformly rendering the inside of the extracted region 57.

FIGS. 19A and 19B are drawings to describe cause (2) of the problem in the image processing method in the related art. The figures show correction of the extracted region. FIG. 19A shows the contrast medium region 56 before correction, and here a lesion part (polyp), etc., indicated by an arrow H exists. FIG. 19B shows the region 57 after correction, and the shape of the lesion part, etc., indicated by an arrow J is deformed. Thus, the shape of the lesion part, etc., also changes by correcting the extracted region, and therefore a precise diagnosis is hindered and it may become difficult to calculate the precise deformation amount. Thus, it is not desirable to solve the problem shown in FIGS. 18A-18C by correcting the extracted region. Even by this method, it is not possible to completely remove the discontinuous change caused by binary extraction of opacity value, and therefore this method does not lead to a substantial solution.

SUMMARY OF THE INVENTION

The present invention has been made in view of the above circumstances, and provides an image processing method and a computer readable medium for image processing, capable of precisely presenting information of an observation object.

In some implementations, an image processing method of the invention using volume data, the image processing method comprising:

extracting a region of the volume data;
transforming voxel values in the extracted region into at least two different voxel values; and
presenting information of the extracted region by using the transformed voxel values.

According to the described configuration, the extracted region is rendered using the voxel values having at least two values, whereby the effect of the loss of the information caused by uniformly rendering the extracted region can be eliminated, and deformation of the contour portion of the extracted region can be prevented, thus resulting in contribution to precise diagnosis of the observation object.

In some implementations, an image processing method of the invention using volume data, the image processing method comprising:

extracting a region of the volume data;
acquiring opacity values by voxel values in the extracted region;
transforming the opacity values into at least two different opacity values; and
presenting information of the extracted region by using the transformed opacity values.

According to the described configuration, the extracted region is rendered using the transformed opacity values, whereby the effect of the loss of the information caused by uniformly rendering the extracted region can be eliminated, and deformation of the contour portion of the extracted region can be prevented, thus resulting in contribution to precise diagnosis of the observation object. Only the opacity value can be changed without changing color information, and the user can conduct an appropriate image diagnosis in response to the organ to be observed. Further, only the opacity value can be changed without changing shading, and the user can conduct an appropriate image diagnosis in response to the organ to be observed.

The image processing method further comprising:
creating a transform function by using statistical information of the voxel values of the volume data in the extracted region,
wherein the voxel values or the opacity values of the volume data in the extracted region are transformed by using the created transform function.

According to the described configuration, the transform function can be adjusted automatically according to the characteristic of the observation object, so that the observation object can be rendered precisely and rapidly.

The image processing method further comprising:
extracting at least two regions of the volume data,
wherein voxel values or opacity values of the volume data in the extracted regions are transformed for the respective regions.

According to the described configuration, the observation object can be rendered more precisely.

In the image processing method, the presented information is a rendering image of the extracted region.

In the image processing method, the presented information is a measurement result of the extracted region.

In the image processing method, the image processing is performed by network distributed processing.

In the image processing method, the image processing is performed by using a graphics processing unit (GPU).

In the image processing method, a processing object is a medical image.

In some implementations, a computer readable medium of the invention having a program including instructions for permitting a computer to execute image processing using volume data, the instructions comprising:

extracting a region of the volume data;
transforming voxel values in the extracted region into at least two different voxel values; and
presenting information of the extracted region by using the transformed voxel values.

In some implementations, a computer readable medium of the invention having a program including instructions for permitting a computer to execute image processing using volume data, the instructions comprising:

extracting a region of the volume data;
acquiring opacity values by voxel values in the extracted region;
transforming the opacity values into at least two different opacity values; and
presenting information of the extracted region by using the transformed opacity values.

According to the invention, the information of the extracted region is presented using the transformed voxel values (or opacity values), whereby the effect of the loss of the information caused by uniformly rendering the extracted region can be eliminated, and deformation of the contour portion of the extracted region can be prevented, thus resulting in contribution to precise diagnosis of the observation object.

BRIEF DESCRIPTION OF THE DRAWINGS

In the accompanying drawings:

FIGS. 2A and 2B are drawings to show generation of an image using CT values in an extracted region to describe the image processing method according to an embodiment of the invention;

FIGS. 3A-3C are drawings to describe an image processing method according to a first embodiment of the invention;

FIGS. 9A-9C are drawings to describe an image processing method according to a second embodiment of the invention;

FIGS. 11A and 11B are drawings to describe an image processing method according to a third embodiment of the invention;

FIGS. 17A-17C are drawings for explaining profiles of a tissue;

DESCRIPTION OF THE PREFERRED EMBODIMENTS

Figure 1:
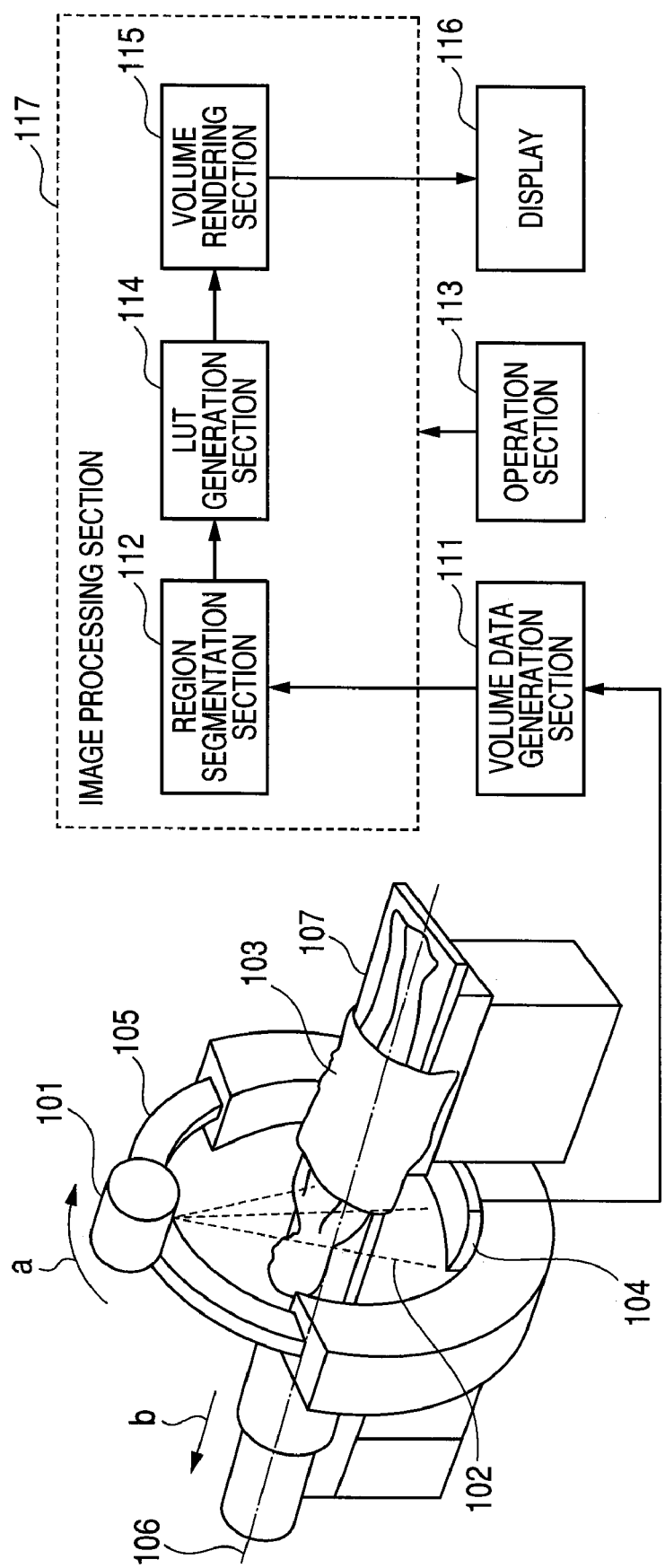
FIG. 1 is a schematic drawing of a computed tomography (CT) apparatus used with an image processing method according to an embodiment of the invention.

FIG. 1 schematically shows a computed tomography (CT) apparatus used in an image processing method according to an embodiment of the invention. The computed tomography apparatus is used for visualizing tissues, etc., of a subject. A pyramid-like X-ray beam 102 having edge beams which is represented by dotted lines in FIG. 1 is emitted from an X-ray source 101. The X-ray beam 102 is applied on an X-ray detector 104 after transmitting through the subject, for example, a patient 103. In this embodiment, the X-ray source 101 and the X-ray detector 104 are disposed in a ring-like gantry 105 so as to face each other. The ring-like gantry 105 is supported by a retainer not shown in FIG. 1 so as to be rotatable (see the arrow "a") about a system axis 106 which passes through the center point of the gantry.

The patient 103 is lying on a table 107 through which the X-rays are transmitted. The table 107 is supported by a retainer which is not shown in FIG. 1 so as to be movable (see the arrow "b") along the system axis 106.

Thus a CT system is configured so that the X-ray source 101 and the X-ray detector 104 are rotatable about the system axis 106 and movable along the system axis 106 relatively to the patient 103. Accordingly, X-rays can be cast on the patient 103 at various projection angles and in various positions with respect to the system axis 106. An output signal from the X-ray detector 104 when the X-rays are cast on the patient 103 are supplied to a volume data generating section 111 and transformed into a volume data.

In sequence scanning, the patient 103 is scanned in accordance with each sectional layer of the patient 103. When the patient 103 is scanned, while the X-ray source 101 and the X-ray detector 104 rotate around the patient 103 about the system axis 106 as its center, the CT system including the X-ray source 101 and the X-ray detector 104 captures a large number of projections to scan each two-dimensional sectional layer of the patient 103. A tomogram displaying the scanned sectional layer is reconstructed from the measured values acquired at that time. While the sectional layers are scanned continuously, the patient 103 is moved along the system axis 106 every time the scanning of one sectional layer is completed. This process is repeated until all sectional layers of interest are captured.

On the other hand, during spiral scanning, the table 107 moves along the direction of the arrow "b" continuously while the CT system including the X-ray source 101 and the X-ray detector 104 rotates about the system axis 106. That is, the CT system including the X-ray source 101 and the X-ray detector 104 moves on a spiral track continuously and relatively to the patient 103 until the region of interest of the patient 103 is captured completely. In this embodiment, signals of a large number of successive sectional layers in a diagnosing area of the patient 103 are supplied to a volume data generating section 111 by the computed tomography apparatus shown in FIG. 1.

Volume data generated by the volume data generation section 111 is introduced into a region segmentation section 112 in an image processing section 117. The region segmentation section 112 extracts a predetermined region of the volume data. An LUT generation section 114 generates a LUT (lookup table) function.

A volume rendering section 115 creates a volume rendering image by using the LUT function created by the LUT generation section 114, with respect to the volume data in the predetermined region extracted by the region segmentation section 112. The volume rendering image processed by the volume rendering section 115 is supplied to and is displayed on a display 116. In addition to the display of the volume rendering image, display of organ function analysis result, parallel display of different types of images, animation display of displaying a plurality of images in sequence, simultaneous display with a virtual endoscope (VE) image, etc., is presented on the display 116.

An operation section 113 sets the predetermined region to be extracted which is used in region segmentation section 112, the display angle of the volume rendering image, etc., in response to an operation signal from a keyboard, a mouse, etc., generates a control signal of each setup value, and supplies the control signal to the region segmentation section 112, the LUT generation section 114 and the volume rendering section 115. Accordingly, while viewing the image displayed on the display 116, the user can change the image interactively and can observe a lesion in detail.

FIGS. 2A and 2B are drawings to describe the image processing method according to the embodiment of the invention. The drawings show generation of an image by using the CT values in an extracted region. FIG. 2A shows, the organ (observation object) containing a residual, tissue 12 such as an intestine and an extracted region 11 provided by extracting a contrast medium region produced by a contrast medium left in a lumen. The step shown in the figure represents the extracted contrast medium region and the figure shall not be rendered. The rendering result is a volume rendering image.

FIG. 2B shows the CT values and opacity values on a profile line p3-p5 passing through a point p3 in the extracted region 11, a point p4 in the inner wall surface of the tissue 12, and a point p5 in the tissue 12. In the embodiment, flexible transform (transform to two or more CT values and opacity values) using CT value and opacity value information is executed for rendering. The transforming of the CT values or opacity values is not a uniform transform to a single value as in related art. The region of the tissue 12 indicated by an arrow B is rendered as usual (without transforming the CT values or opacity value).

According to the embodiment, information of the CT value and opacity value before transform is used for rendering, and the extracted region 11 is not rendered uniformly. Thus, the organ can be precisely rendered while the important information such as the shape of polyp contained in the contour portion of the extracted region 11 is retained.

First Embodiment

FIGS. 3A-3C are drawings to describe an image processing method according to a first embodiment of the invention. FIG. 3A shows rendering of the organ containing a residual. This can be a tissue 12 such as an intestine including an extracted region 11 provided by extracting a contrast medium region produced by a contrast medium left in a lumen.

FIG. 3B shows the CT values on a profile line p3-p5 passing through a point p3 in the extracted region 11, a point p4 in the inner wall surface of the tissue 12, and a point p5 in the tissue 12 and the opacity values obtained from the CT values. In the embodiment, the CT values in the extracted region 11 are referred to and new CT values are generated for creating a profile as shown in FIG. 3C. In FIG. 3C, the CT values and the opacity values obtained from the CT values make a smooth transition between the extracted region and the tissue, and the organ can be rendered clearly.

Thus, according to the embodiment, the CT values in the extracted region 11 are transformed to new CT values, and the extracted region 11 is rendered based on the new CT values. The rendering of the extracted region is done nonuniform, so that the effect of the information loss caused by uniformly rendering the extracted region 11 can be eliminated for rendering the organ precisely.

Figure 4:
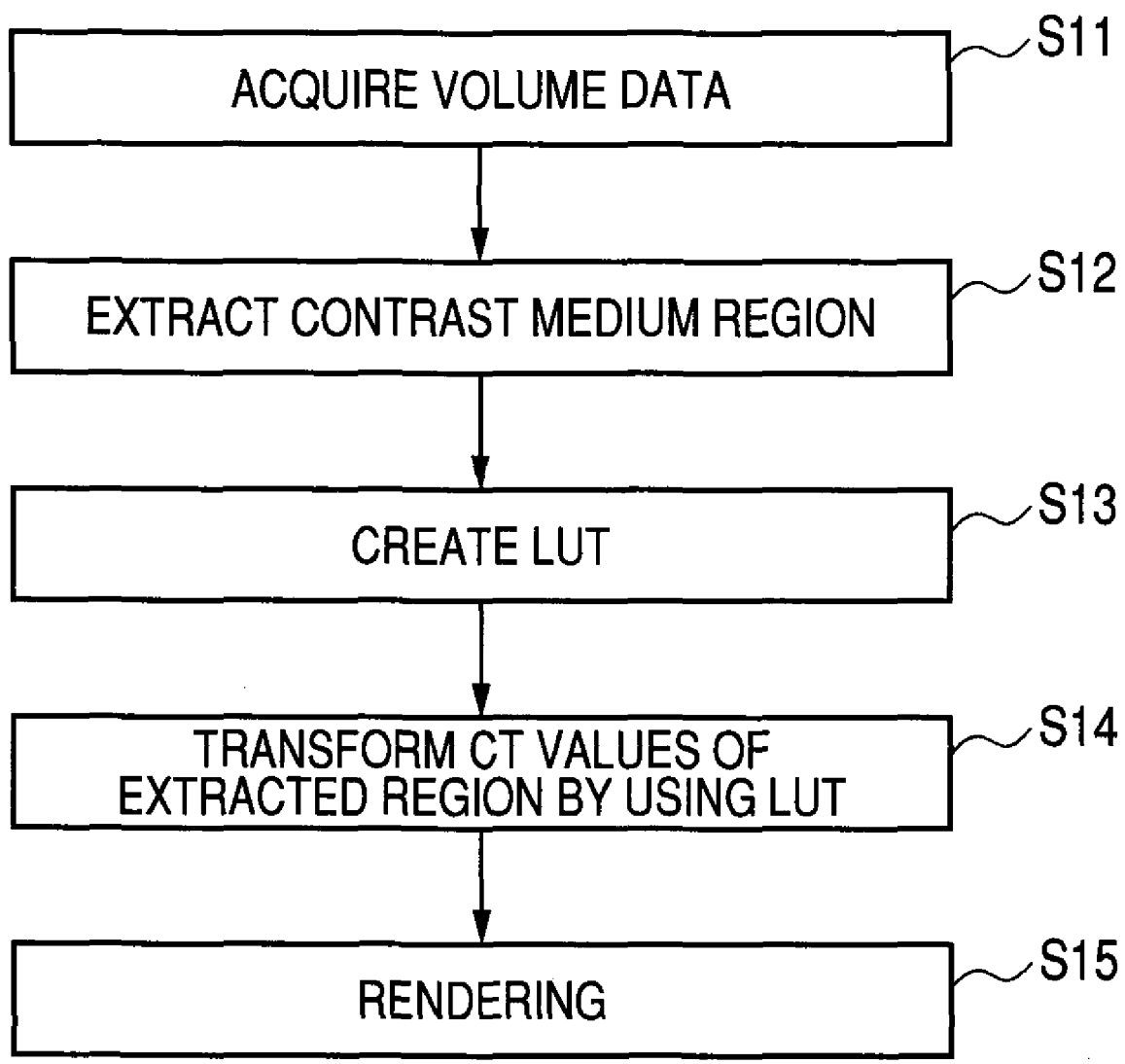
FIG. 4 is a flowchart of the image processing method according to a first embodiment of the invention.

FIG. 4 is a flowchart of the image processing method according to the first embodiment of the invention. In the embodiment, volume data is acquired from a CT apparatus (step S11), and the contrast medium region in where contrast medium is left as a residual is extracted (step S12).

Next, a lookup table (LUT) is created (step S13), and the CT values of the extracted region are transformed by using the lookup table (step S14), and the transformed CT values are used to render the organ (step S15).

According to the embodiment, the contrast medium region is extracted, a lookup table is created, and the CT values of the extracted region are transformed by using the lookup table, rendering the extracted region is done nonuniform, so that the effect of the information loss caused by uniformly rendering the extracted region of the contrast medium region can be eliminated, hence the organ shall be rendered precisely.

Figure 5:
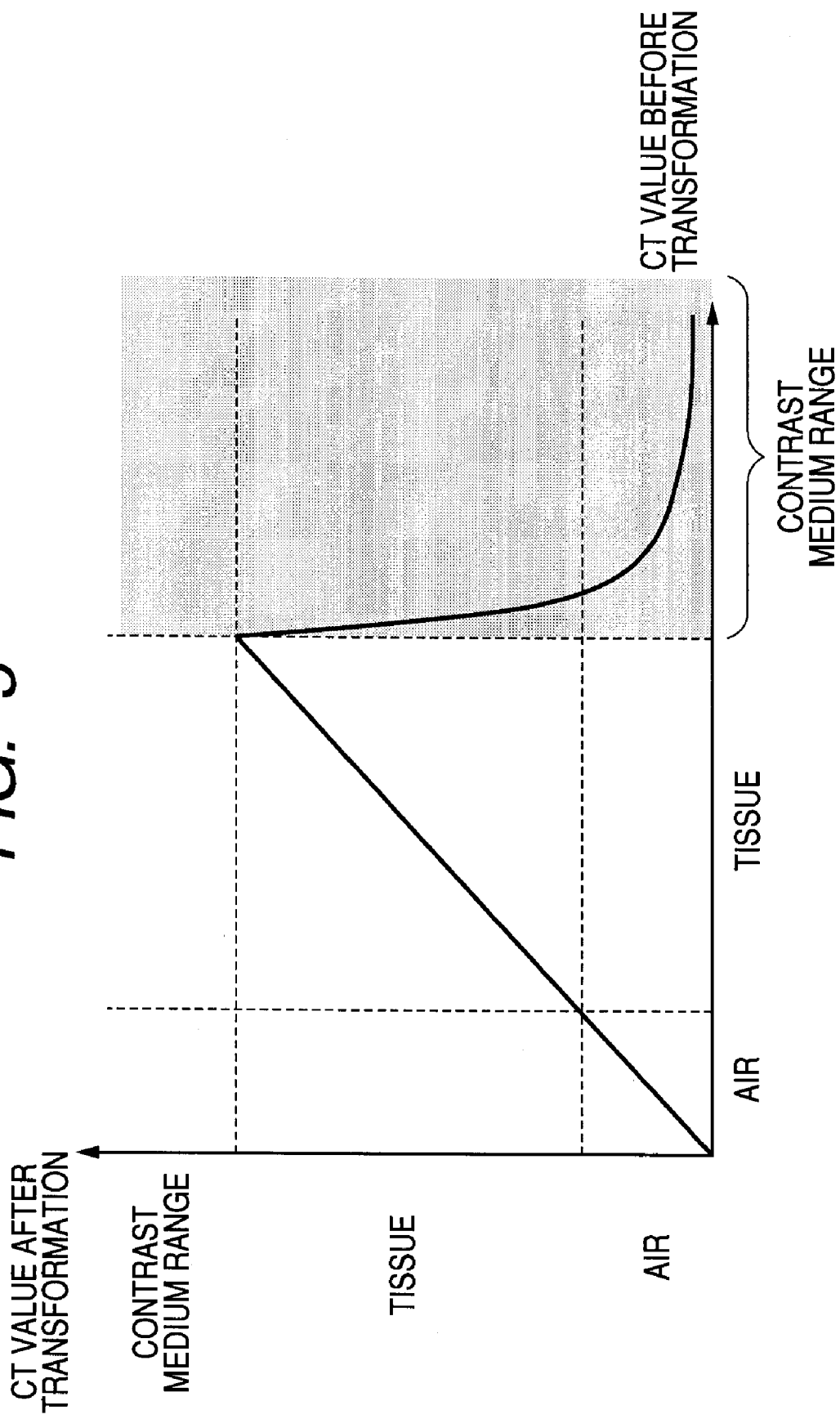
FIG. 5 is a drawing to show a lookup table in the image processing method according to a first embodiment of the invention

FIG. 5 shows a lookup table in the image processing method according to the embodiment of the invention. The lookup table is to convert the CT values in the contrast medium range in accordance with a transform function using statistical information of the CT values in the extracted region, without transforming the CT values in the CT value ranges of air and tissue.

According to the embodiment, the lookup table in the contrast medium region is determined by using the statistical information of the CT values in the extracted region, so that the organ can be precisely rendered while the important information such as the shape of polyp contained in the contour portion of the extracted region is retained, without producing any step due to binary region segmentation. Further, since the transform function can be adjusted automatically according to the characteristic of the observation object, the observation object can be rendered precisely and rapidly.

Figure 6:
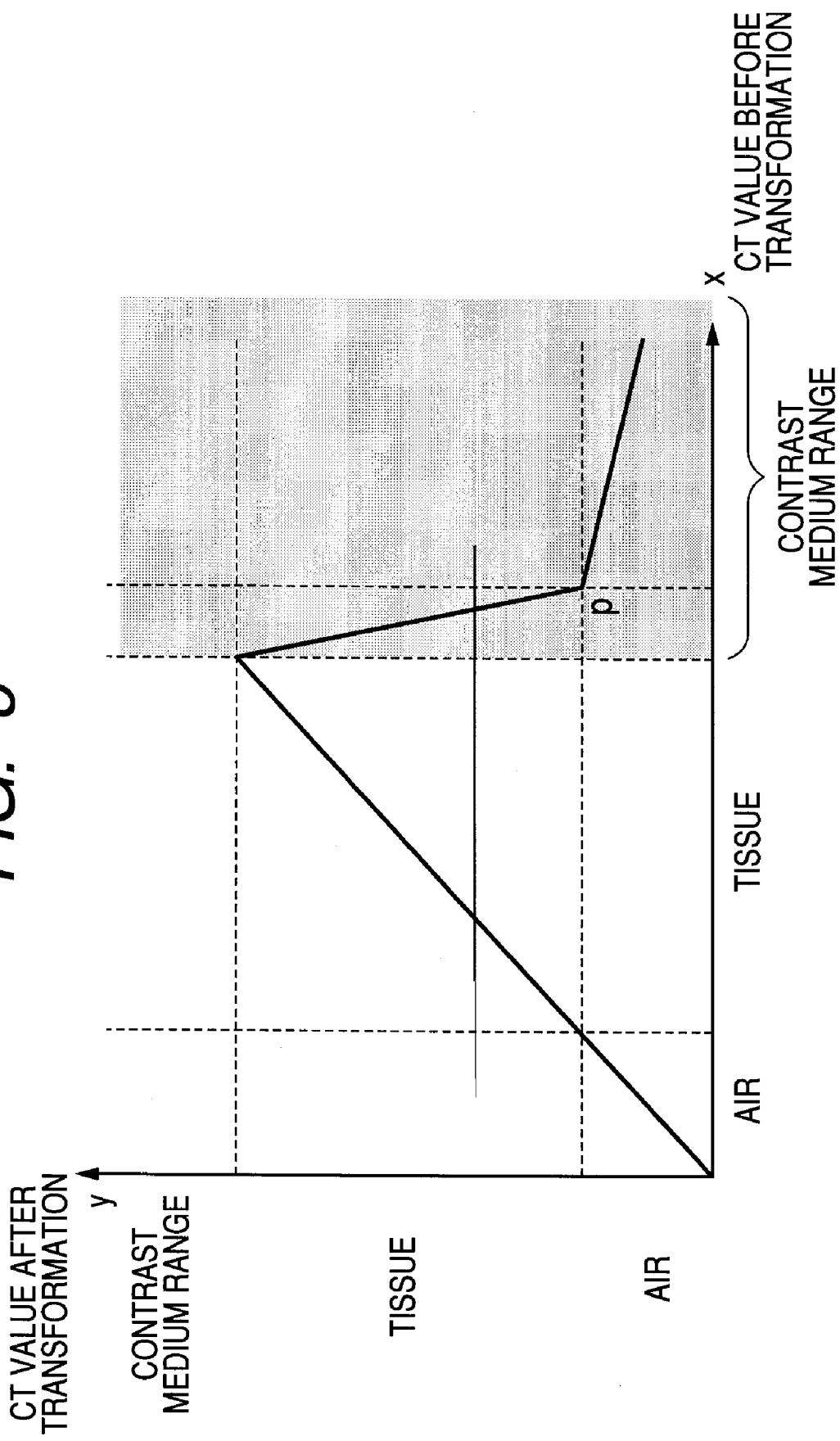
FIG. 6 shows an example (1) of a lookup table based on statistical information of CT values of a contrast medium region in the image processing method according to a first embodiment of the invention.

FIG. 6 shows an example (1) of a lookup table using the statistical information of the extracted region for CT value transform in the image processing method according to the embodiment of the invention. In the embodiment, the CT values in the contrast medium range are transformed according to a polygonal line passing through a point P, without transforming the CT values in the CT value ranges of air and tissue. The lookup table is defined by using the CT values of the voxels in the extracted region as samples of the statistical information. For example, the value of the x coordinate of the point P is the high-order 10% value of the samples, (average value+square root of variance) of samples, (average value+maximum value)/2 of samples. The value of the y coordinate of the point P is the low-order 10% value of the samples in the contrast medium range, (average value of samples in contrast medium range−square root of variance of all samples), (average value+minimum value)/2 of samples, for example. The values of the x and y coordinates may be specified values; for example, the values may be the boundary values between air and tissue or may be user-specified values.

According to the embodiment, the x and y coordinates of the point P are determined based on the statistical information of the CT values of the extracted region, whereby the thickness of the contour portion of the extracted region can be set and the organ can be precisely rendered while the important information such as the shape of polyp contained in the contour portion of the extracted region is retained. Further, since the transform function can be adjusted automatically according to the characteristic of the observation object, the observation object can be rendered precisely and rapidly.

Figure 7:
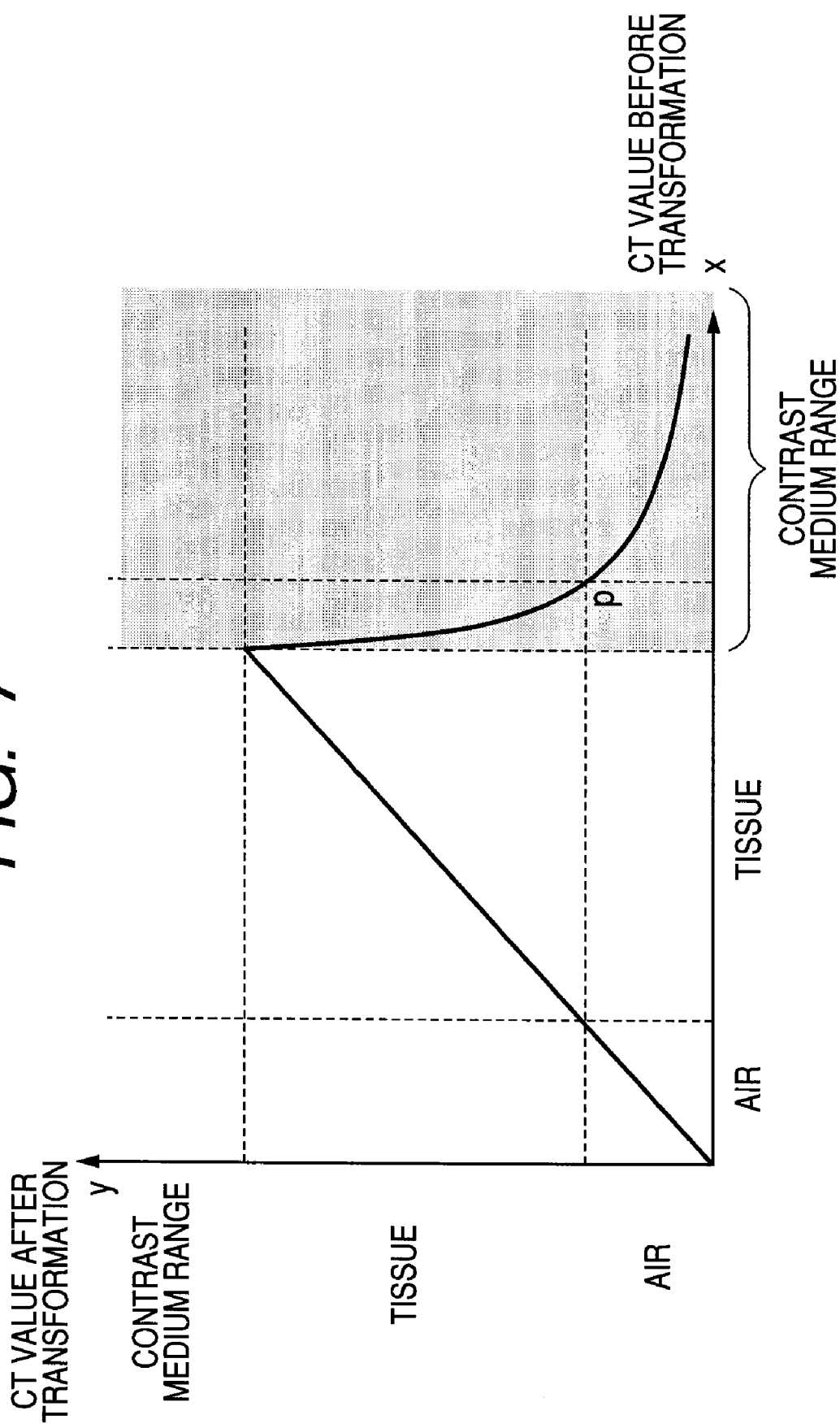
FIG. 7 shows an example (2) of a lookup table based on statistical information of CT values of a contrast medium region in the image processing method according to a first embodiment of the invention.

FIG. 7 shows an example (2) of a lookup table using the statistical information of the extracted region for CT value transform in the image processing method according to the embodiment of the invention. In the embodiment, the CT values of air and tissue are transformed linearly, and the CT values in the contrast medium range are transformed based on a curve passing through the point P.

According to the embodiment, the x and y coordinates of the point P are determined based on the statistical information of the CT values of the extracted region, whereby the thickness of the contour portion of the extracted region is set, and the CT values are transformed based on a curve passing through the point P, so that an image wherein artifact that occurs due to discrete processing is lessened can be rendered, and polyp, etc., contained in the contour portion of the extracted region can be rendered precisely.

Figure 8:
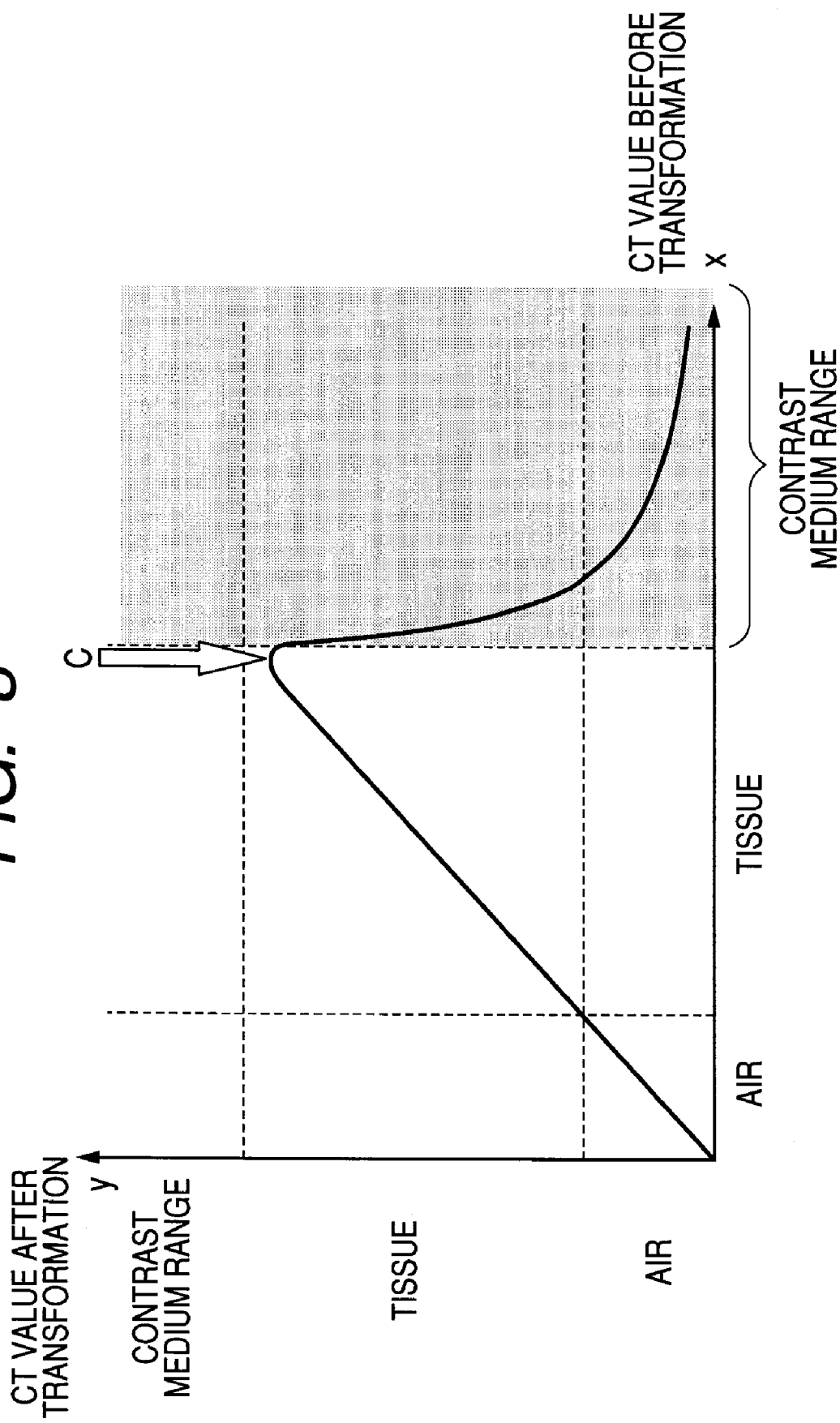
FIG. 8 shows an example (3) of a lookup table based on statistical information of CT values of a contrast medium region in the image processing method according to a first embodiment of the invention.

FIG. 8 shows an example (3) of a lookup table using the statistical information of the extracted region for CT value transform in the image processing method according to the embodiment of the invention. In the embodiment, the CT values of air and tissue are transformed linearly, and the CT values in the contrast medium range are transformed based on a curve and the CT values after transform are allowed to make a continuous transition between the tissue and the contrast medium range as indicated by an arrow C.

According to the embodiment, the CT values are transformed based on a curve making a continuous transition between the tissue and the contrast medium range, so that an image wherein artifact that occurs due to discrete processing is lessened can be rendered, and polyp, etc., contained in the contour portion of the extracted region can be rendered precisely.

Second Embodiment

FIGS. 9A-9C are drawings to describe an image processing method according to a second embodiment of the invention. In the first embodiment, the CT values of the extracted region where the contrast medium remains are transformed according to a transform function, whereby the effect of the contrast medium is eliminated in rendering the organ. In the second embodiment, the opacity values of the extracted region where a contrast medium remains are transformed according to a transform function, whereby the effect of the contrast medium is eliminated in rendering the organ. The opacity value is derived from the CT value together with color information and shading information.

FIG. 9A shows the organ (observation object) containing a residual, tissue 12 such as an intestine and an extracted region 11 provided by extracting a contrast medium region produced by a contrast medium left in a lumen. FIG. 9B shows the CT values and the opacity values on a profile line p3-p5 passing through a point p3 in the extracted region 11, a point p4 in the inner wall surface of the tissue 12, and a point p5 in the tissue 12. In the embodiment, the opacity values in the extracted region of the profile shown in FIG. 9B is transformed to lower values according to a lookup table responsive to CT value and opacity value, whereby the profile is transformed as shown in FIG. 9C. In FIG. 9C, the opacity values of the extracted region and the tissue make a smooth transition, and the organ can be rendered clearly.

According to the embodiment, the opacity value in the extracted region is decreased, whereby the organ can be precisely rendered without producing any step due to binary region segmentation. The opacity value is transformed independently of color information and shading information, whereby, for example, when the tissue in the extracted region is displayed translucently, the color and shading responsive to the CT value of the tissue are given, whereby the user can be precisely informed of the state of the object.

Figure 10:
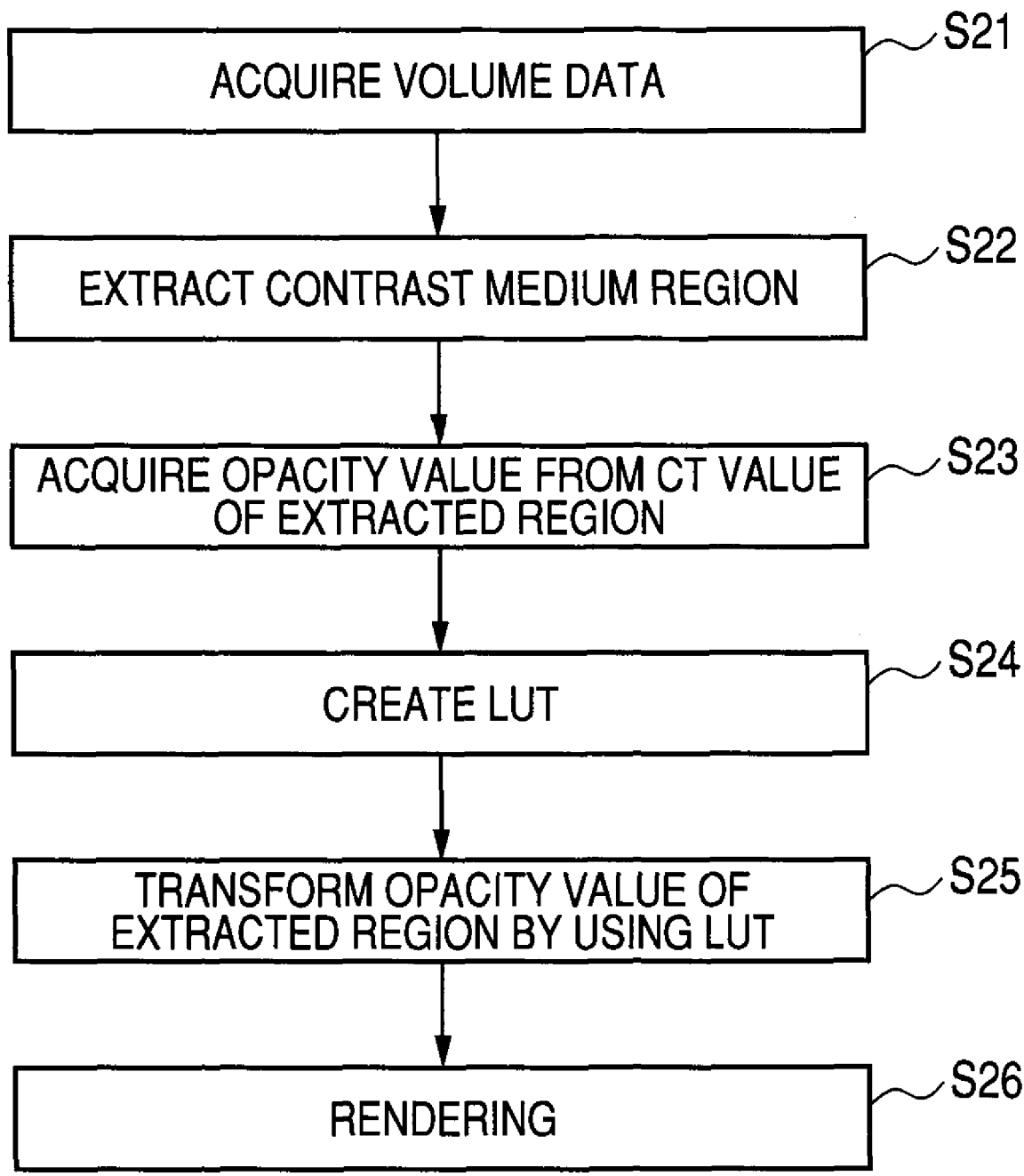
FIG. 10 is a flowchart of the image processing method according to a second embodiment of the invention.
Figure 12B:
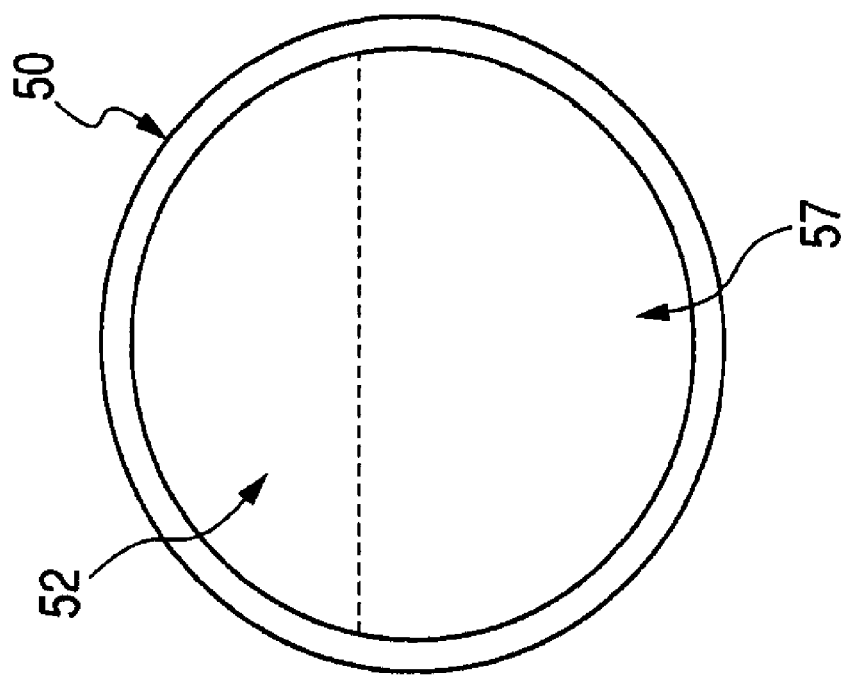
FIGS. 12A and 12B are drawings to show a situation in which an organ is rendered using volume data.
Figure 12A:
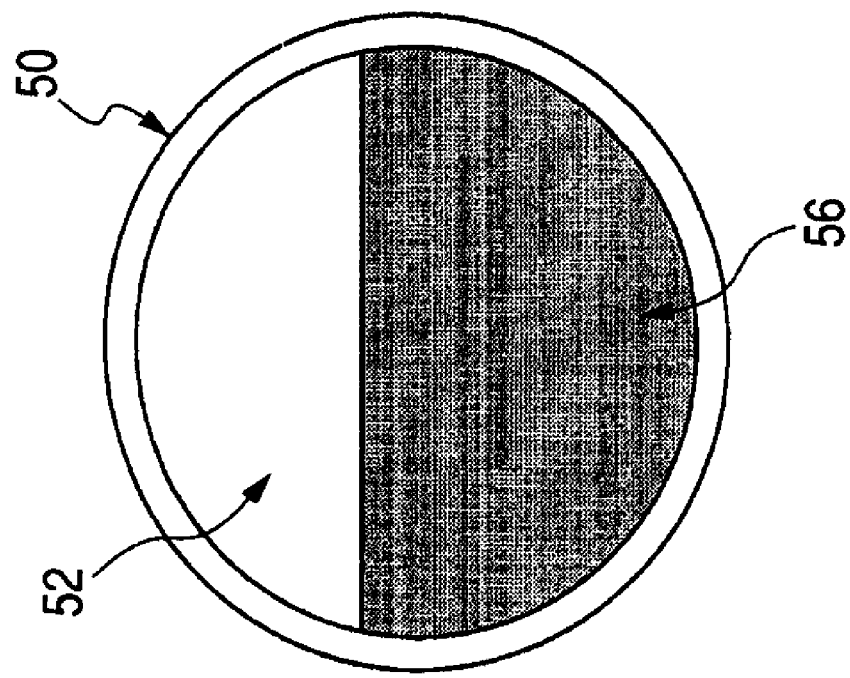
Figure 13:
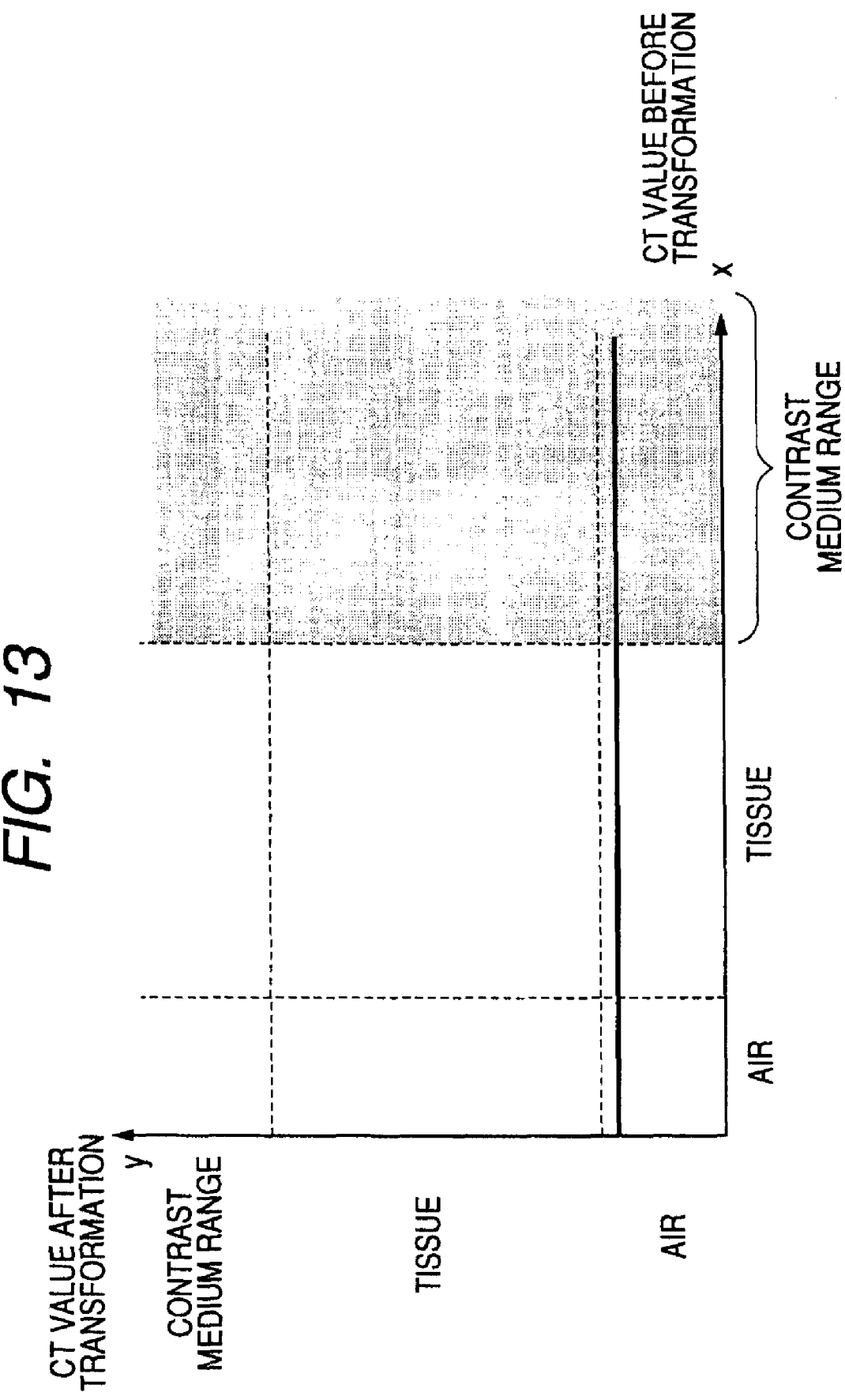
FIG. 13 is a graph to show the correspondence between the CT values before transform and those after transform in an image processing method in a related art.
Figure 14:
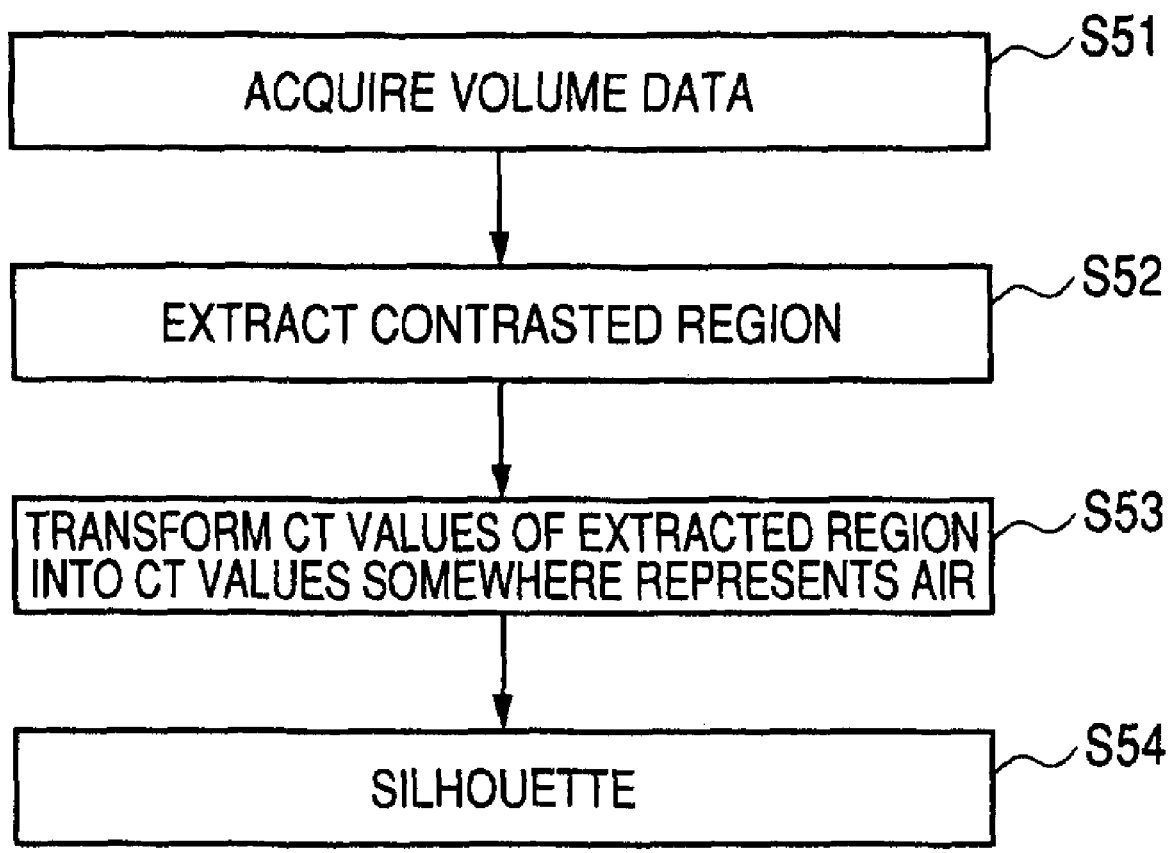
FIG. 14 is a flowchart to show the image processing method in the related art.
Figure 15:
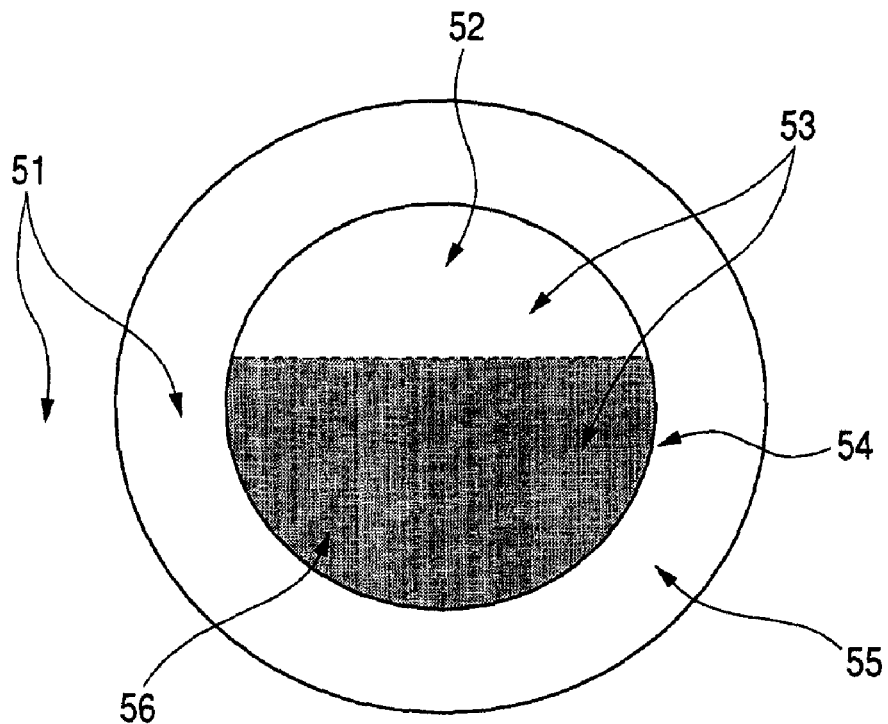
FIG. 15 is a schematic representation of terms concerning the internal tissue regions of a human body.
Figure 16:
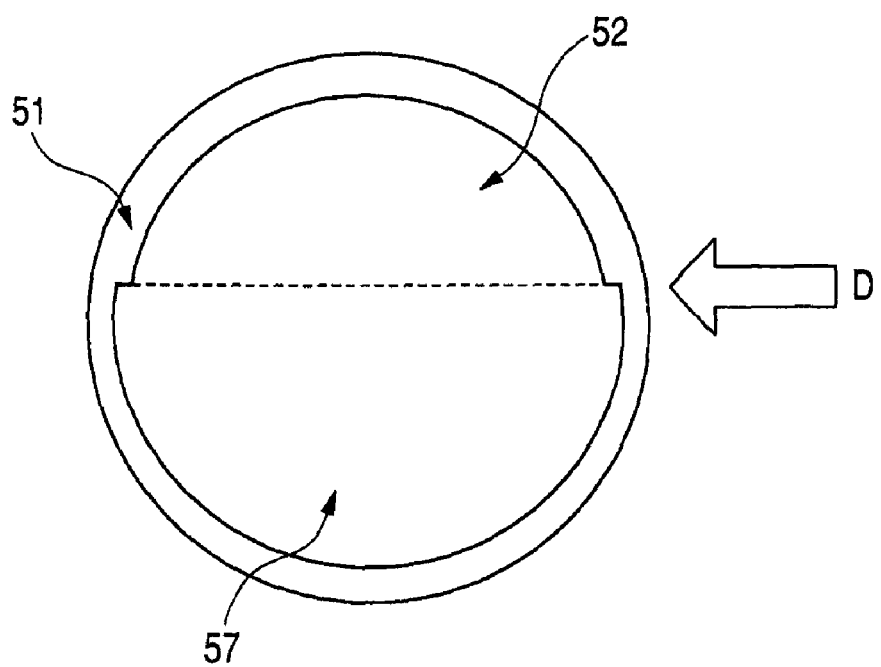
FIG. 16 is a drawing to describe a problem of the image processing method in the related art.
Figure 19B:
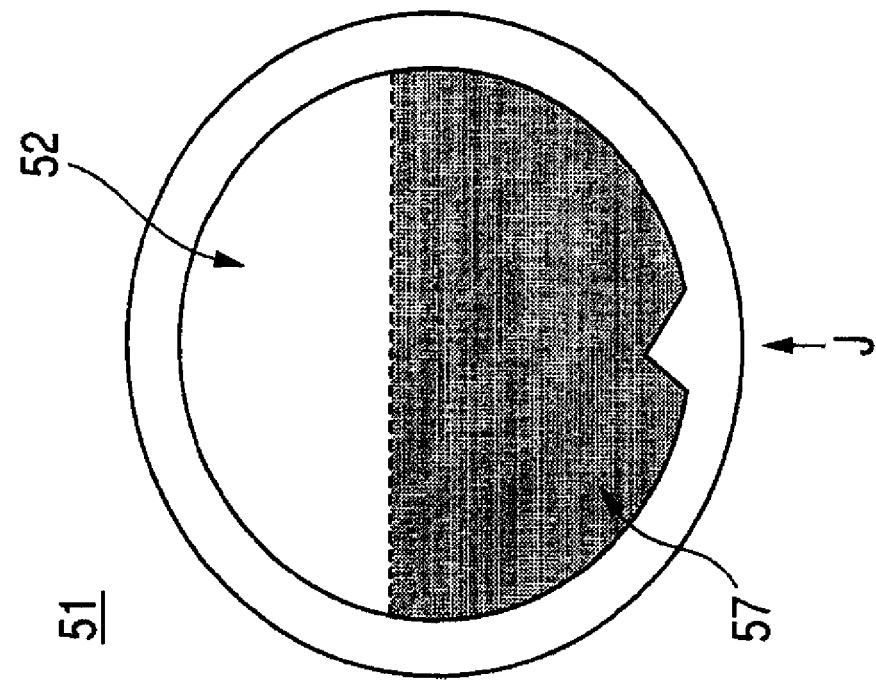
FIGS. 19A and 19B are drawings to describe cause (2) of the problem in the image processing method in the related art.
Figure 19A:
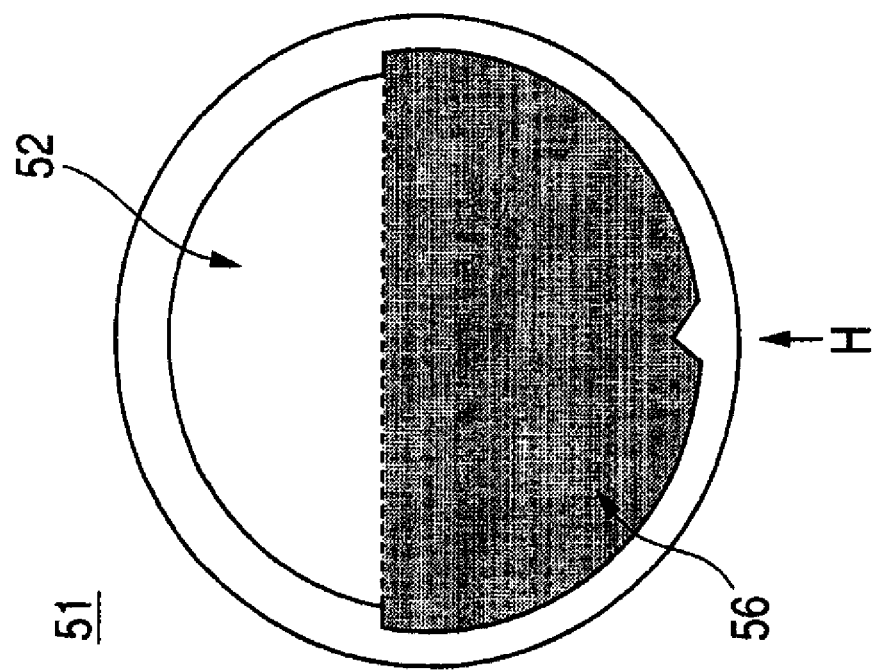
Figure 12B:
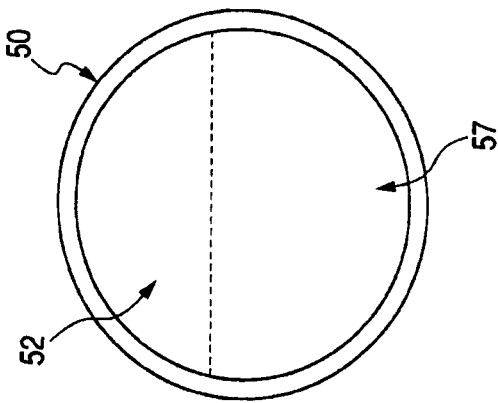
Figure 12A:
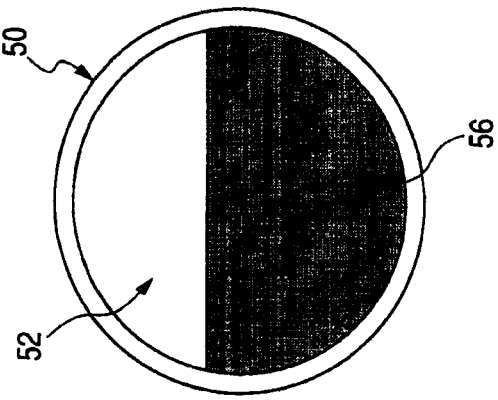
Figure 14:
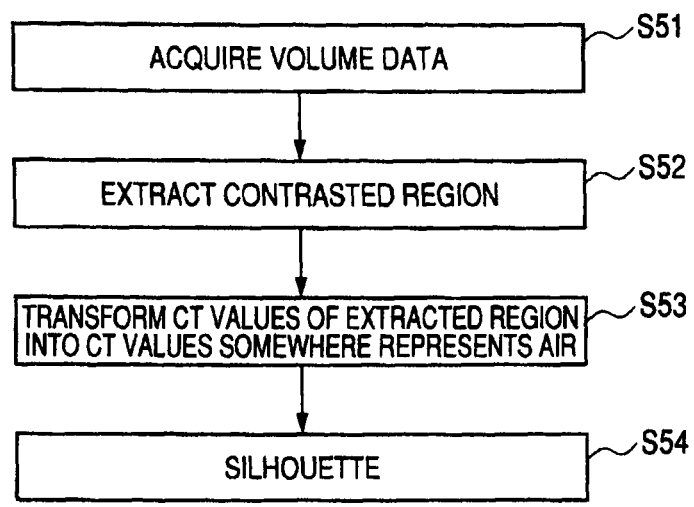
Figure 15:
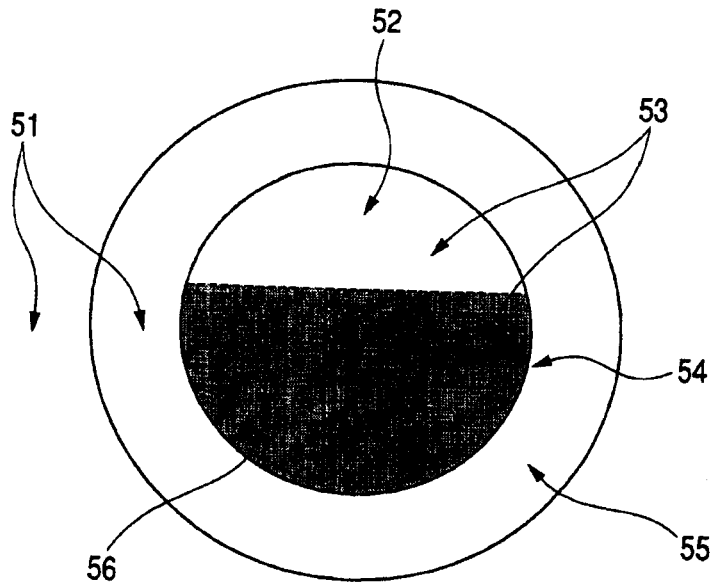
Figure 16:
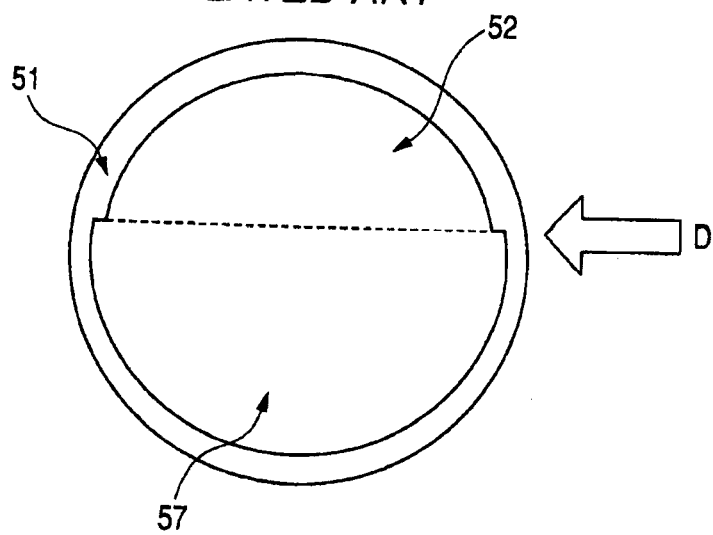
Figure 18B:
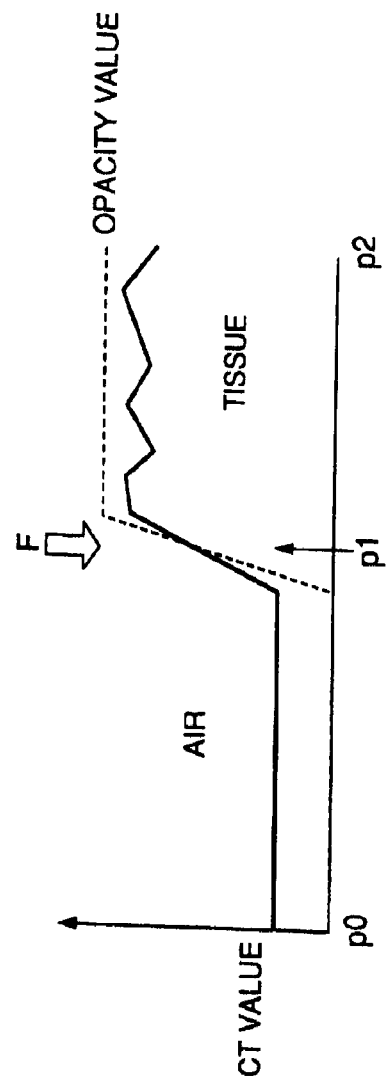
FIGS. 18A-18C are drawings to describe cause (1) of the problem in the image processing method in the related art.
Figure 18C:
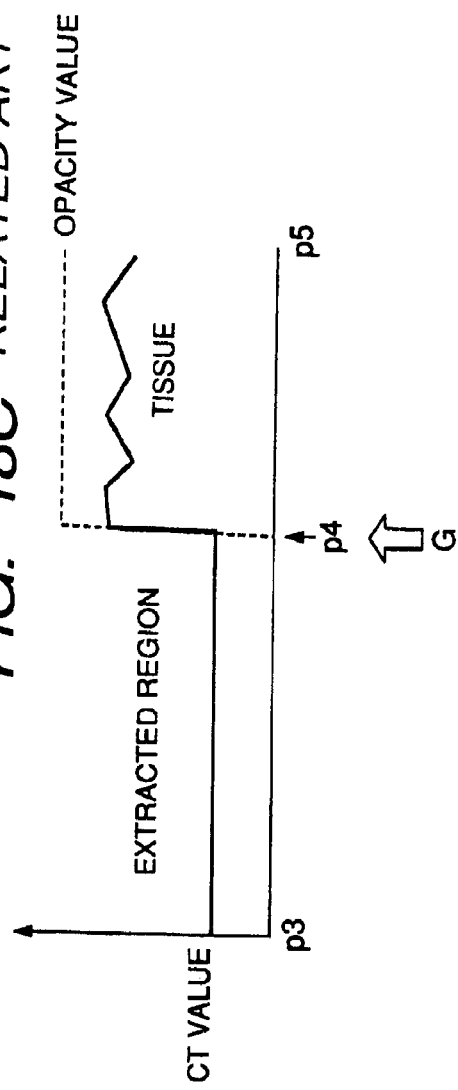
Figure 18A:
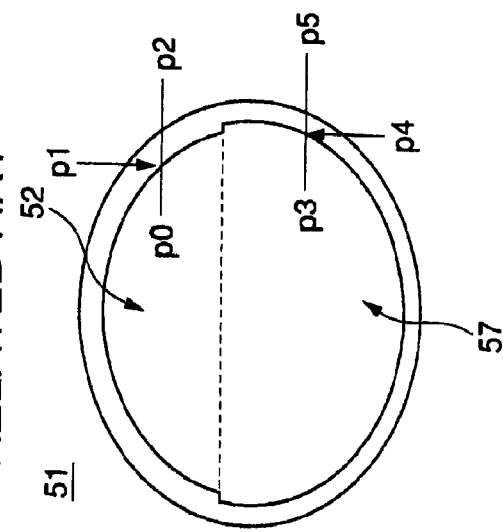
Figure 19B:
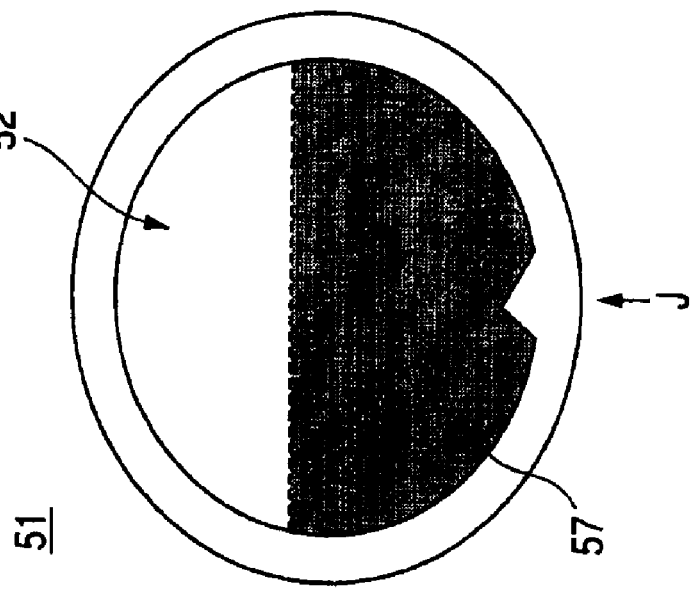
Figure 19A:
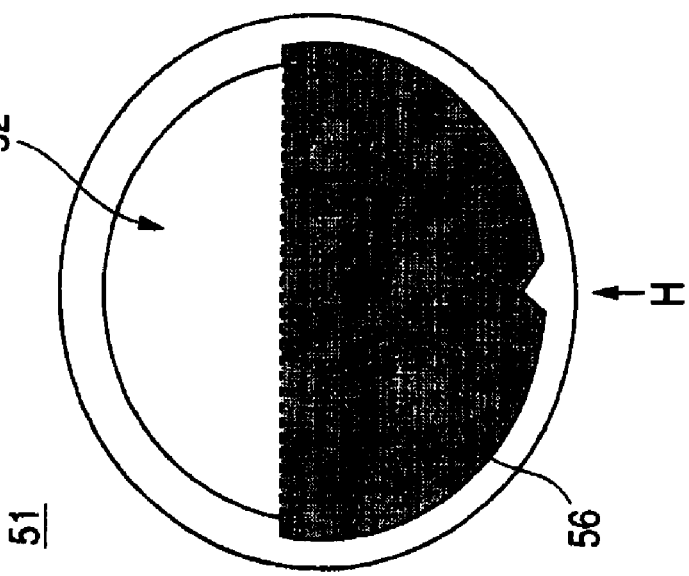

FIG. 10 is a flowchart of the image processing method according to the second embodiment of the invention. In the embodiment, volume data is acquired from a CT apparatus (step S21), and the contrast medium region is extracted (step S22).

Next, the opacity value is acquired from the CT value of the extracted region (step S23), and a lookup table is created (step S24). The opacity value of the extracted region is transformed using the lookup table (step S25), and the transformed opacity value is used to render the organ (step S26).

According to the embodiment, the opacity value is acquired from the CT value of the extracted region, a lookup table is created, and the opacity value of the extracted region is transformed by using the lookup table, so that only the opacity value can be changed while the color information is the same, and the user can conduct an appropriate image diagnosis in response to the organ to be observed.

Third Embodiment

FIGS. 11A and 11B are drawings to describe an image processing method according to a third embodiment of the invention. FIG. 11A shows the organ (observation object) containing a residual, tissue 12 such as an intestine, an extracted region 11 provided by extracting a contrast medium region produced by a contrast medium left in a lumen, and a transition part 13 as a marginal part of the extracted region 11.

FIG. 11B shows the CT values and the opacity values on a profile line p3-p5 passing through a point p3 outside the transition part 13 in the extracted region 11, a point p4 in the transition part 13, a point p6 in the inner wall surface of the tissue 12, and a point p5 in the tissue 12. In the embodiment, a different lookup table is used for the marginal part of the extracted region 11 as the transition part 13. In so doing, the opacity values are allowed to make a transition more naturally. The transition part 13 may comprise multiple levels. The transition part 13 may vary according to the position in the tissue.

According to the embodiment, the extracted region is divided into a plurality of regions and the opacity values or the CT values are transformed using a different lookup table for each region, whereby the step of the marginal part is removed for rendering, and the precise image of the organ can be rendered. For example, a bubble, etc., is prevented from being displayed erroneously in the center of the extracted region, etc.

In the first embodiment, the CT values are transformed using the lookup table based on the statistical information of the CT values by way of example, while on the other hand in this embodiment the opacity values may be transformed using the lookup table based on the statistical information of the CT values. Only the opacity value can be changed while the color information is the same, and the user can conduct an appropriate image diagnosis in response to the organ to be observed.

Calculation process of generating an image can be performed by a GPU (Graphics Processing Unit). GPU is a processing unit designed for being specialized to image processing as compared with a general-purpose CPU, and usually is installed in a computer separately from the CPU.

In the image processing method of the embodiment, volume rendering calculation can be divided at predetermined angle units, regions in an image, regions in a volume, etc., and the divided calculation results can be superposed later, so that the image processing can be performed by parallel processing, network distributed processing, a dedicated processor, or using them in combination.

In the description given above, the CT values and the opacity values of the contrast medium region are transformed using the lookup table by way of example, but may be transformed using any other technique implementing a piecewise continuous function other than the lookup table. For example, a spline curve, a polynomial, etc., can be used.

In the second embodiment, the tissue in the extracted region is displayed translucently or transparently using the opacity values derived from the CT values, but a multivalued mask or any other means capable of representing the opacity values in the image may be used.

In the image processing method of the embodiment, the CT values provided by a CT apparatus are used, but the voxel values of any type of volume data can be used. For example, the embodiment may be applied to volume data provided by an MRI apparatus, volume data provided by a PET apparatus, volume data provided by combining different types of volume data or any other calculation.

In the description of the image processing method of the embodiment, the intestine is taken as an example, but the image processing method can also be used for the digestive organs including a stomach. That is, the method can be used for any organ if the organ is hollow.

In the image processing method of the embodiment, an image is rendered, but information generated by the method may be presented to the user in any other forms, such as measurement result obtained from transformed voxel values and opacity values. For example, the voxel values and opacity values after transform or before and after transform may be presented numerically. The voxel values and opacity values before and after transform may be used to analyze the lesion part such as polyp, whereby the diameter, the curvature, the size, etc., of the polyp, etc are presented. In so doing, the measurement result corresponding to the image display of the image processing method of the embodiment can be provided and more precise diagnosis is made possible.

The embodiments of the invention can be also achieved by a computer readable medium in which a program code (an executable program, an intermediate code program, and a source program) according to the above described image processing method is stored so that a computer can read it, and by allowing the computer (or a CPU or an MCU) to read out the program (software) stored in the storage medium and to execute it.

The computer readable medium includes, for example, a tape-type medium, such as a magnetic tape or a cassette tape, a disc-type medium including a magnetic disc, such as a floppy® disc or a hard disc, and an optical disc, such as CD-ROM/MO/MD/DVD/CD-R, a card-type medium, such as an IC card (including a memory card) or an optical card, and a semiconductor memory, such as a mask ROM, an EPROM, an EEPROM, or a flash ROM.

Further, the computer may be constituted such that it can be connected to a communication network, and the program may be supplied thereto through the communication network. The communication network includes, for example, the Internet, the Intranet, an intranet, an extranet, a LAN, an ISDN, a VAN, a CATV communication network, a virtual private network, telephone lines, a mobile communication network, and a satellite communication network. A transmission medium for constituting the communication network includes, for example, wire lines, such as IEEE1394, USB, power lines, cable TV lines, telephone lines, and ADSL lines, infrared rays, such as IrDA or a remote controller, and wireless lines, such as Bluetooth (a registered trademark), 802.11 Wireless, HDR, a mobile communication network, satellite lines, and a terrestrial digital broadcasting network. In addition, the program may be incorporated into carrier waves and then transmitted in the form of computer data signals.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

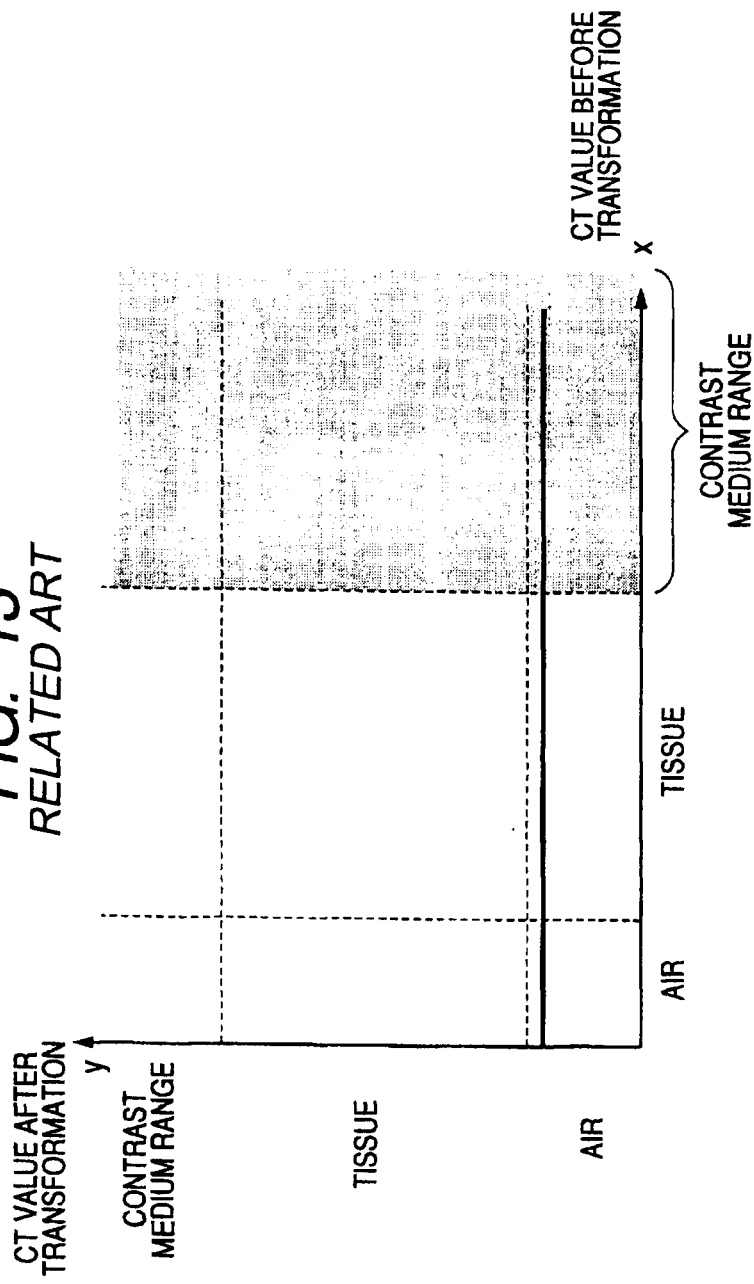

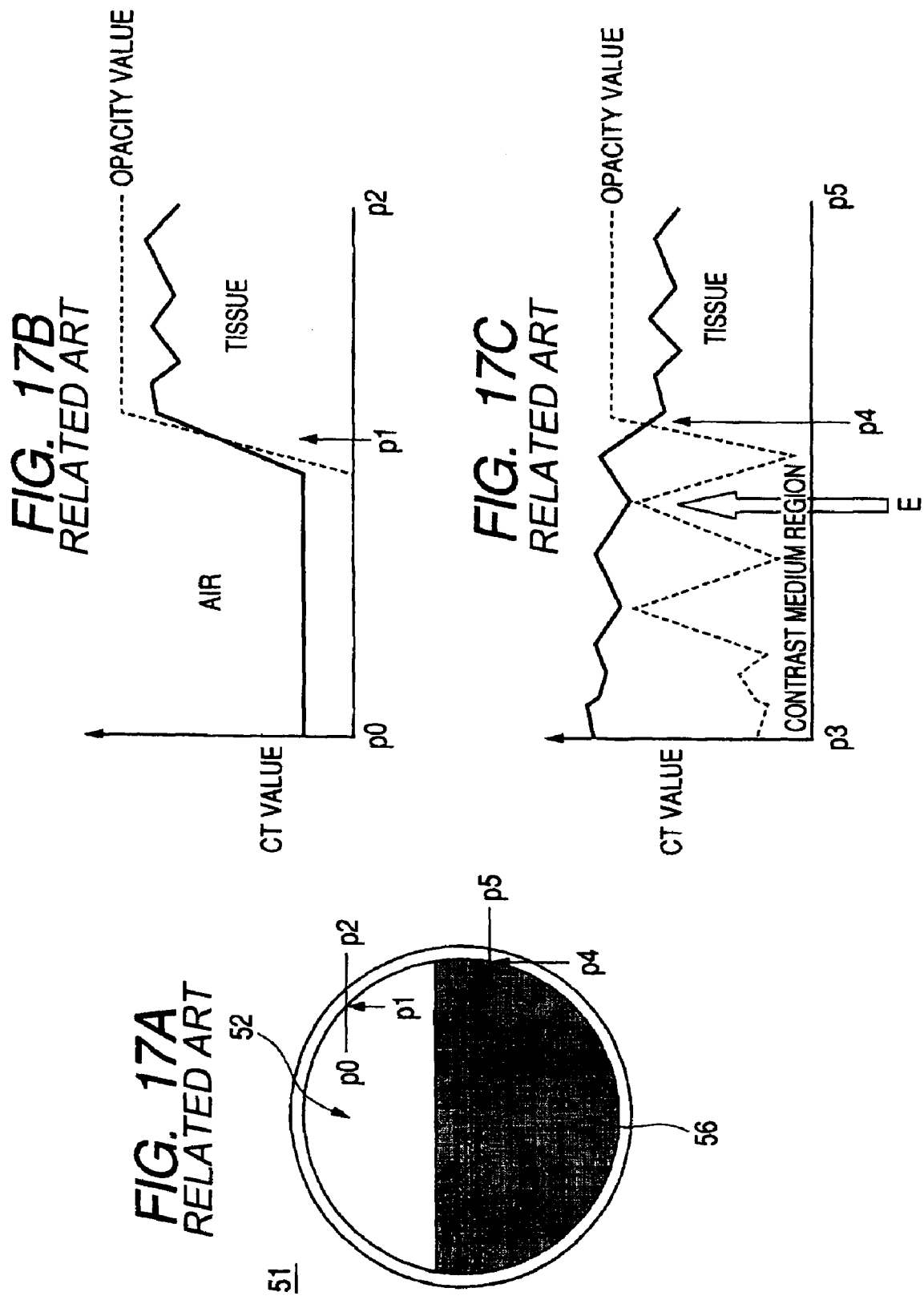

What is claimed is:

1. An image processing method using volume data, the image processing method comprising:
    extracting a region of the volume data;
    using a processing unit of a computer, transforming voxel values in said extracted region into at least two different voxel values; and
    presenting information of the extracted region by using the transformed voxel values.

2. The image processing method as claimed in claim 1, further comprising:
    creating a transform function by using statistical information of the voxel values of the volume data in the extracted region,
    wherein the voxel values of the volume data in the extracted region are transformed by using the created transform function.

3. The image processing method as claimed in claim 1, further comprising:
    extracting at least two regions of the volume data,
    wherein voxel values of the volume data in the extracted regions are transformed for the respective regions.

4. The image processing method as claimed in claim 1, wherein the presented information is a rendering image of the extracted region.

5. The image processing method as claimed in claim 1, wherein the presented information is a measurement result of the extracted region.

6. The image processing method as claimed in claim 1, wherein the image processing is performed by network distributed processing.

7. The image processing method as claimed in claim 1, wherein the processing unit is a graphics processing unit (GPU).

8. The image processing method as claimed in claim 1, wherein a processing object is a medical image.

9. An image processing method using volume data, the image processing method comprising:
    extracting a region of the volume data;
    acquiring opacity values by voxel values in said extracted region;
    using a processing unit of a computer, transforming said opacity values into at least two different opacity values; and
    presenting information of the extracted region by using the transformed opacity values.

10. The image processing method as claimed in claim 9, further comprising:
    creating a transform function by using statistical information of the voxel values of the volume data in the extracted region,
    wherein the opacity values of the volume data in the extracted region are transformed by using the created transform function.

11. The image processing method as claimed in claim 9, further comprising:
    extracting at least two regions of the volume data,
    wherein opacity values of the volume data in the extracted regions are transformed for the respective regions.

12. The image processing method as claimed in claim 9, wherein the presented information is a rendering image of the extracted region.

13. The image processing method as claimed in claim 9, wherein the presented information is a measurement result of the extracted region.

14. The image processing method as claimed in claim 9, wherein the image processing is performed by network distributed processing.

15. The image processing method as claimed in claim 9, wherein the processing unit is a graphics processing unit (GPU).

16. The image processing method as claimed in claim 9, wherein a processing object is a medical image.

17. A computer readable medium having a program including instructions for permitting a computer to execute image processing using volume data, the instructions comprising:
    extracting a region of the volume data;

using a processing unit of the computer, transforming voxel values in said extracted region into at least two different voxel values; and presenting information of the extracted region by using the transformed voxel values.

18. A computer readable medium having a program including instructions for permitting a computer to execute image processing using volume data, the instructions comprising:

extracting a region of the volume data;

acquiring opacity values by voxel values in said extracted region;

using a processing unit of the computer, transforming the opacity values into at least two different opacity values; and presenting information of the extracted region by using the transformed opacity values.

* * * * *

UNITED STATES PATENT AND TRADEMARK OFFICE
CERTIFICATE OF CORRECTION

| | | |
|---|---|---|
| PATENT NO. | : 7,860,284 B2 | Page 1 of 8 |
| APPLICATION NO. | : 11/669184 | |
| DATED | : December 28, 2010 | |
| INVENTOR(S) | : Kazuhiko Matsumoto | |

It is certified that error appears in the above-identified patent and that said Letters Patent is hereby corrected as shown below:

In Drawings:

Substitute the attached drawing sheets 12 of 18 through 18 of 18 with the drawings sheets below.

In Column 5, line 11, after the word "invention" begin a new paragraph, beginning with FIG. 6.

Signed and Sealed this
Nineteenth Day of April, 2011

David J. Kappos
*Director of the United States Patent and Trademark Office*